(12) United States Patent
Blackbourne et al.

(10) Patent No.: US 10,217,213 B2
(45) Date of Patent: Feb. 26, 2019

(54) AUTOMATIC FOCUSED ASSESSMENT WITH SONOGRAPHY FOR TRAUMA EXAMS

(71) Applicants: Lorne Blackbourne, Kingsbury, TX (US); Eric Chin, San Antonio, TX (US); Ronald Grisell, Spring Branch, TX (US); Jose Salinas, San Antonio, TX (US); Shane Summers, San Antonio, TX (US)

(72) Inventors: Lorne Blackbourne, Kingsbury, TX (US); Eric Chin, San Antonio, TX (US); Ronald Grisell, Spring Branch, TX (US); Jose Salinas, San Antonio, TX (US); Shane Summers, San Antonio, TX (US)

(73) Assignee: The United States of America as represented by The Secretary of the Army, Washington, DC (US)

( * ) Notice: Subject to any disclaimer, the term of this patent is extended or adjusted under 35 U.S.C. 154(b) by 0 days.

(21) Appl. No.: 15/026,197

(22) PCT Filed: Sep. 30, 2014

(86) PCT No.: PCT/US2014/058374
§ 371 (c)(1),
(2) Date: Mar. 30, 2016

(87) PCT Pub. No.: WO2015/048767
PCT Pub. Date: Apr. 2, 2015

(65) Prior Publication Data
US 2016/0239959 A1    Aug. 18, 2016

Related U.S. Application Data

(60) Provisional application No. 61/884,630, filed on Sep. 30, 2013.

(51) Int. Cl.
*G06T 7/00* (2017.01)
*G06K 9/46* (2006.01)

(52) U.S. Cl.
CPC .............. *G06T 7/0012* (2013.01); *G06K 9/46* (2013.01); *G06K 2209/05* (2013.01);
(Continued)

(58) Field of Classification Search
CPC ......... G06T 7/0012; G06T 2207/10132; G06T 2207/30061; G06K 9/46; G06K 2209/05; G06K 2209/051
See application file for complete search history.

(56) References Cited

U.S. PATENT DOCUMENTS 6,368,286 B1    4/2002   Whitman et al.
6,650,924 B2   11/2003   Kuth et al.
(Continued)

FOREIGN PATENT DOCUMENTS

WO         9858588 A1     12/1998
WO      2008073560 A3      6/2008

OTHER PUBLICATIONS

Tsai et al. "Ring Down Artefacts on Abdominal Sonography to Predict Pulmonary Abnormalities in the Emergency Department." Emerg Med J, 22, 2005, pp. 747-748.*
(Continued)

*Primary Examiner* — Jon Chang
(74) *Attorney, Agent, or Firm* — Elizabeth Arwine, Esq.

(57) ABSTRACT

An embodiment of the invention provides a method for identifying internal trauma in a patient for pneumothorax, hemothorax and abdominal hemorrhage using ultrasound in B-modes with radial, longitudinal, phased array probes, and with M-mode for verification of lung sliding and lung point. Identifications are based on statistical classifications of image features, including A-line, B-line, lung sliding, bar-
(Continued)

code, sky, seashore, and beach patterns. For blood pools, a polygon is fitted to the boundary, and a cellular automaton extracts local interference patterns due to cavity shape. Logic is then applied to extractions to identify the trauma. With B-mode, feature extraction involves specialized algorithms operating at frame rate for tracking of features such as ribs and rib shadows, pleural line and fast changes in peak intensities along the pleural line. Results are presented on screen by means of highlighting and textual cues.

17 Claims, 19 Drawing Sheets

(52) U.S. Cl.
CPC .............. *G06K 2209/051* (2013.01); *G06T 2207/10132* (2013.01); *G06T 2207/30061* (2013.01)

(56) References Cited

U.S. PATENT DOCUMENTS

| | | | |
|---|---|---|---|
| 7,920,731 | B2 | 4/2011 | Moreau-Gobard |
| 8,394,031 | B2 | 3/2013 | Mansy et al. |
| 2007/0019846 | A1 | 1/2007 | Bullitt et al. |
| 2007/0066895 | A1* | 3/2007 | Sikdar ............... A61B 8/06 600/437 |
| 2008/0183077 | A1 | 7/2008 | Moreau-Gobard et al. |
| 2008/0234567 | A1 | 9/2008 | Tearney et al. |
| 2009/0149748 | A1 | 6/2009 | Lenhardt et al. |
| 2009/0177092 | A1 | 7/2009 | Riechers et al. |
| 2010/0222663 | A1 | 9/2010 | Wilder et al. |
| 2010/0274130 | A1 | 10/2010 | Anand et al. |
| 2012/0016240 | A1 | 1/2012 | Lee et al. |
| 2013/0018240 | A1 | 1/2013 | McCoy |
| 2013/0197370 | A1* | 8/2013 | Burlina ............... G06K 9/4642 600/476 |
| 2014/0213901 | A1* | 7/2014 | Shackelford ......... A61B 8/085 600/437 |

OTHER PUBLICATIONS

Kline et al. "Detection of Pneumothorax with Ultrasound." AANA Journal, vol. 81, No. 4, Aug. 2013, pp. 265-271.*
Chan, S.: "Emergency Bedside Ultrasound to Detect Pneumothorax," Academic Emergency Medicine, Jan. 2003, pp. 91-94, 10-1.
Perera, P. et al.: "The RUSH Exam: Rapid Ultrasound in SHock in the Evaluation of the Critically Ill," Emergency Medicine Clinic North America, 2010, pp. 29-56, 28, Elsevier.
Lichtenstein et al, "Ultrasound diagnosis of occult pneumothorax*", Crit Care Med, 2005, Retrieved on [Nov. 30, 2014]. Retrieved from the internet <URL: http://ccm.anest.ufl.edu/files/2012/08/JC7-OccultPneumo.pdf> entire document.
Testa et al, "Psychiatric emergencies (part III): psychiatric symptoms resulting from organic diseases", European Review for Medical and Pharmacological Sciences, Feb. 17, 2013, Retrieved on [Nov. 30, 2014]. Retrieved from the Internet <URL: http://www.europeanreview.org/wp/wp-content/uploads/86-99.pdf> entire document.
Soldati et al, "The ultrasonographic deep sulcus sign in traumatic pneumothorax", Ultrasound in Med. & Biol., vol. 32, No. 8, 2006, Retrieved on [Nov. 30, 2014]. Retrieved from the internet <URL: http://www.ultrasoundleadershipacademy.com/wp-content/uploads/2014/01/Ultrasound_in_medicine_biology_2006_Soldati.pdf> entire document.
International Search Report for PCT/US2014/058374. dated Feb. 1, 2015 entire document.
Written Opinion of the International Search Authority for PCT/US2014/058374. dated Feb. 1, 2015 entire document.

* cited by examiner

AUTOMATIC FOCUSED ASSESSMENT WITH SONOGRAPHY FOR TRAUMA EXAMS

This application is the National Stage of international application no. PCT/US2014/058374, filed Sep. 30, 2014, which claims the benefit of U.S. Provisional Patent Application Ser. No. 61/884,630 filed on 30 Sep. 2013.

BACKGROUND

The present invention is in the field of systems, methods, and computer program products for automatic focused assessment with sonography for trauma (FAST) exams.

SUMMARY OF THE INVENTION

An embodiment of the invention includes a method for identifying internal trauma in a patient, the method comprising filtering acquired images by a filtering device to remove artifacts and identifying patterns in the filtered images by a processor. The patterns can include an irregular blob fitted to a blood pool, an A-line pattern, a B-line pattern, a lung sliding pattern, a barcode pattern, a sky pattern, a seashore pattern, and/or a beach pattern. Rules are applied to the identified patterns by an analysis engine to identify the internal trauma, wherein the internal trauma can include pneumothorax, hemothorax, and/or abdominal hemorrhaging.

In at least one embodiment, the artifacts can include streaks, standing wave patterns, and/or instrument noise. In accordance with the preceding embodiment or the first embodiment, the acquired images can include a plurality of individual frames successively captured from a sonographic video. In accordance with the embodiment in the previous paragraph or the embodiment in this paragraph, the A-line pattern can include substantially horizontal and substantially straight narrow bands of apparent reflection parallel to and below a pleural line. The pleural line can include a bright, substantially horizontal or radial narrow band indicating probable reflection from fluid between a chest wall membrane and a membrane surrounding lungs, wherein the fluid is a lubricant to aid the lungs in sliding within the chest as a person breaths.

In accordance with the embodiment in the previous paragraph or the first embodiment, the A-line pattern can include line(s) between skin and a muscle layer between ribs. In accordance with the embodiment in the previous paragraph or the first embodiment, the A-line pattern can include line(s) between outer muscles and lungs. In accordance with the embodiment in the previous paragraph or the first embodiment, the B-line pattern can include a band of varied bright intensities radiating downwards from a pleural line to a bottom of an image. In accordance with the embodiment in the previous paragraph or the first embodiment, the lung sliding pattern can include rapidly moving peaks of intensity along a pleural line. In accordance with the embodiment in the previous paragraph or the first embodiment, the lung sliding pattern can include rapid movement of ring-downs, wherein the ring-downs include short, substantially triangular interference patterns just below the pleural line. The ring-downs can be present due to adhesions between inner and outer membranes of a pleural interface and/or a small air bubble in the lungs.

In accordance with the embodiment in the first or second embodiment, the barcode pattern can include a rectangle of adjacent widge patterns that are bounded to the left and right by abrupt changes of intensity, wherein a widge pattern is a horizontal ridge of peak intensity that is only a few pixels wide. In accordance with the embodiment in the first or second embodiment, the sky pattern can include a light horizontal line in an upper portion of an image, and the seashore pattern can include a chain of thin horizontally elongated blobs of maximum intensity on an image. The beach pattern can include a region below the seashore pattern that is mostly grainy. In structure, functionality, and operation of possible implementations of the image can further include an ocean pattern between the sky pattern and the seashore pattern, and the beach pattern can further include barcodes that are shorter and more numerous with respect to barcodes in the ocean pattern.

An embodiment of the invention includes a system having an algorithm for rapid identification of blood or air in body cavities caused by trauma or injury. It has the capability to be embedded in instruments for EXTENDED fast scan (eFAST), including pneumothorax detection (a particularly dangerous condition if not detected soon after injury involving separation of the lungs from the chest wall due to air in this cavity and possible collapse of a lung) and hemothorax (blood in this cavity also causing separation). In addition, the algorithm can detect abdominal hemorrhages. Abdominal hemorrhage and pneumothorax are the two most common causes of preventable deaths on the battlefield. These can be salient causes of death following auto accidents due to blunt force trauma to the chest or abdomen. The algorithm, together with ultrasonic FAST examination equipment, can enable a medic to intervene rapidly in case of a pneumothorax via needle aspiration of the chest. The system can also provide predictive information to aid in more accurate decisions to transport/not transport hemothorax, pneumothorax, and in intra-abdominal hemorrhage cases. The system can be a ruggedized, hand-held unit suitable for forward field deployment and civilian emergency use. The system can be connected via Wi-Fi etc. to external workstations or hospital data systems for review by expert ultrasonographers. The system in at least one embodiment can be simple to use, such that a novice or trainee can use it in the field with little training or just a user manual. The system in at least one embodiment provides a display screen showing either video or still-frame ultrasonic imagery overlaid with colored cues indicating predictive features in the images. This automatically derived information can significantly improve the accuracy of diagnosis by a field medic with little training, and further, can enable tracking of patient bleeding or pneumothorax from field to ICU. Such capabilities can be useful not only in practice, but in training facilities where the medics may review training imagery by themselves and thus facilitate and expedite the training process.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
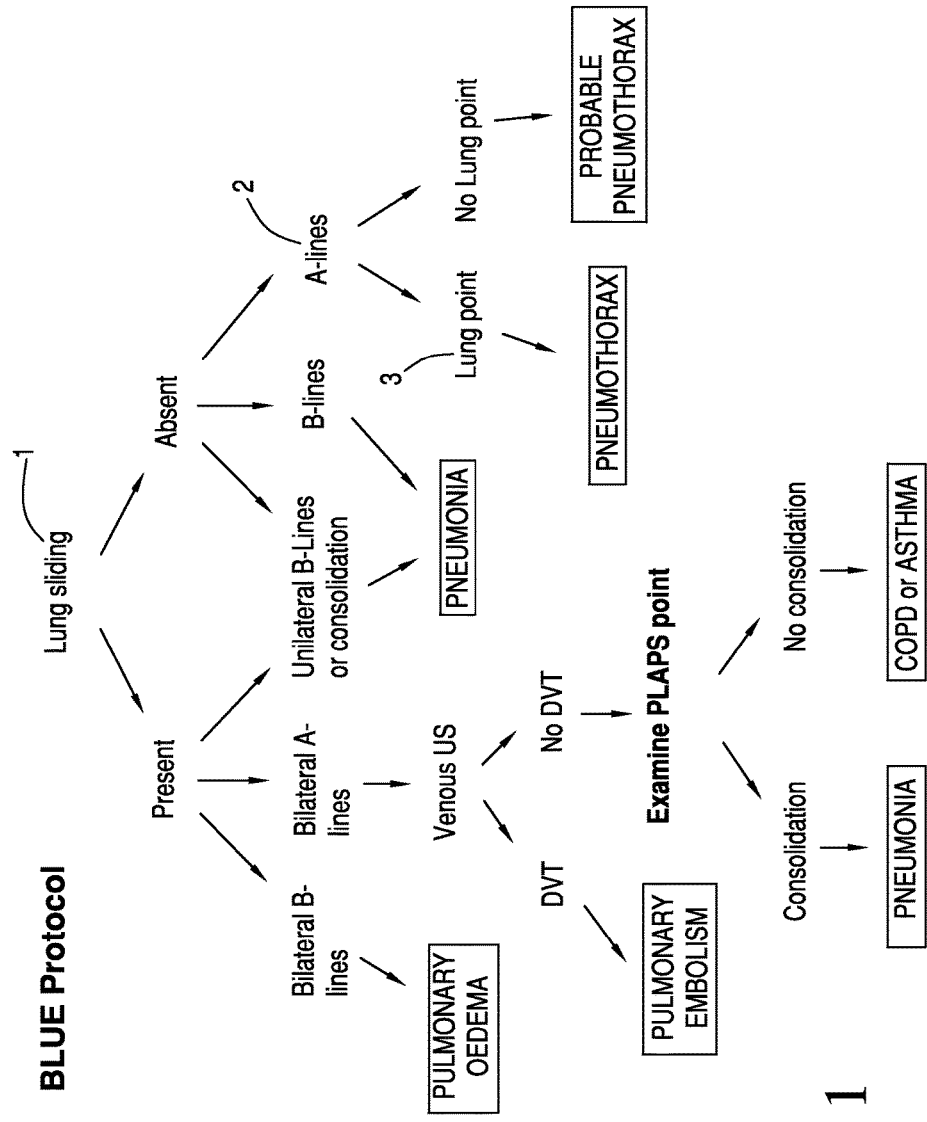
FIG. 1 illustrates a decision tree according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

In at least one embodiment of the invention provides a system and device for automatic Focused Assessment with Sonography for Trauma (iFAST) that includes use of an algorithm for rapid identification of blood or air in body cavities caused by trauma or injury. It has the capability to be embedded in instruments for EXTENDED fast scan (eFAST), including pneumothorax detection (a particularly dangerous condition if not detected soon after injury involving separation of the lungs from the chest wall due to air in this cavity, and possible collapse of a lung, also referred to herein as "PTX") and hemothorax (blood in this cavity also causing separation, also referred to herein as "HTX"). In addition, the algorithm can detect abdominal hemorrhages.

When embedded in a ruggedized tablet-sized unit, the algorithm can run in a highly portable system, unlike current bed-side devices which must be supported by carts near a patient's bed in an ICU unit, for example. It also may not be convenient in the field to record sonographic data in standard electronic medical records (EMR) systems, such as AHLTA, HL7, Cache, etc. In combination with suitable connection to these databases, the system can provide instant recording of user-selected imagery for later analysis. Some imagery can be transmitted via network to a doctor or other medical person who specializes in the interpretation of sonograms.

The algorithm running on a processor can also provide immediate feedback to the ultrasonic examiner to quickly guide the probe to an optimized position, by providing the most incisive chest imagery possible. This can greatly aid the examiner in cases where the image is distorted by artifacts or interior occlusions such as blebs (air pockets), shrapnel, bullets, etc.

As soon after an injury as possible, the first step in diagnosis can be to obtain scans at various points on the chest. Inexpert practitioners typically waste much time gaining good quality ultrasonic scans, so it can be preferred to automatically advise them about less-than-optimal usages.

For example, some tutorials warn the trainee to not make a diagnoses of PTX unless two bones are clearly visible in the imagery. This is mainly because several approximately horizontal wavy curves of relatively high intensity frequently do appear with healthy lungs. Some may be muscle-fat interfaces, some hypodermis-fat, and perhaps some known as E-lines, which are reverberations similar to A-lines but shallower than the lung surface, due to reverberations between some of these layers. In spite of this complexity, a clear delineation of the pleural line (between inner chest wall and lung surface) is preferred, but lack of bone images can make the situation confusing to the human operator and the machine. Therefore, a special set of rules in an expert system to be discussed determine whether there is a bone image on the left, or one on the right, or both, or none. In the case that a bone is imaged on the left but not the right, or vice versa, the user can be cued via text on a suitable box in the system's screen to the effect: "Advise moving the probe up or down until another bone is seen or use a lower-frequency probe" (a probe which shows more bones at once). It may not be very feasible at the current time to detect the particular orientation of the probe, whether up or down relative to the ribs, but it is quite feasible via the algorithm to detect whether the user is holding the probe with the long axis perpendicularly between two ribs by measuring the distance between two rib image centerlines and the depth of the ribs as determined by the frequency of the probe, and in some cases the instrument's depth-of-field setting if available. In another detectable deviation from good practice, the practitioner may hold the probe non-perpendicularly to the ribs, which is simply detected by a grossly slanting pleural line, of which this user is advised to hold the probe more perpendicularly. Such advice to the inexpert user is valuable in that if followed, it increases accuracy of the system's prediction.

A tutorial mode is provided for these cueing purposes, which can be switched off by the expert user. The expert may decide to leave a certain number of cueing capabilities running, such as a sizeable red-yellow-green alert rectangle on the screen when there is a dangerous condition such as pneumothorax or hemothorax. A red colored box can be employed for high danger, yellow for moderate or condition uncertain, and green for low danger, as determined by a certainty-factor scheme. The box can be large enough that a busy medic can detect the color in their peripheral vision. It may be found useful in very distracting and busy situations to flash the color on and off. A sonic cue may also be provided, as well as a speech-generation capability for announcing textual cues.

Even tutorial mode, cueing the user may be limited to a certain extent to avoid distraction. In order to avoid situations where too many cues become distracting, a certainty factor scheme is used where a minimum metric of some kind for a given feature must be exceeded before displaying a color change or a text on the user's screen. The preferred scheme is to count the number of occurrences of key features detected (the features of the BLUE Protocol indicated in FIG. 1) as the video image progresses. Then, at each frame or a certain number to be skipped, it can be determined whether a given count is greater than one third, or a majority, or a two-thirds quorum of the frames processed so far. Some features like B-lines occur infrequently, but if they do, this can be fairly strong evidence for healthy lungs (negative pneumothorax or hemothorax). Other features, such as A-lines, should appear with significant contiguous extents across the image between bones or edges for a quorum of frames. Ant crawling movements typically appear about half the time in healthy lungs (during breathing) so a majority threshold is used in this case. This scheme can cut down the amount of false cueing.

In at least one embodiment, the system does not use ad hoc certainty factors in its predictions, only in display. Instead, it implements known non-parametric (e.g., counting of low frequencies) and parametric methods (e.g. statistically sound) to dynamically estimate various thresholds adjusted to noise level, image width, image height, resolution, as well as recursively smoothing filters, for significantly more accurate decisions used in prediction, as will be described. Slowly-moving features such as pleural lines can be tracked by a recursive filter (e.g., Bayesian or Kalman if feature parameter probability distribution is approximately Gaussian).

Thus, to gain adjustments, feature extraction parameters are adjusted to image properties such as overall image intensity, variance of image intensity, image height, width, etc. Tuning rules or classifiers becomes much less time-consuming and more effective when these overall image parameters are taken into account and re-measured for each image or frame at the beginning of the video sequence obtained. For example, a horizontal, more or less linear feature should have its threshold of detection set in proportion to horizontal extent of the image region of interest, as distance between two bones, distance between or a bone and usable edge, or just between two edges of usable image area. The latter can be automatically detected by the algorithm, which looks for transitions between black borders that typically surround usable area and pixels, as distinct from numerous textual markings displayed by most instruments. The system can ignore these and crop the usable image. Calculations can then automatically determine what the user's gain settings are likely to be, and can compensate for these. Inexpert users can forget to adjust gain of the lower image, so it is faded and of low resolution, or they may turn a knob or move a cursor for too much gain, which saturates the image. In such cases, the system can automatically adjust the imagery for better feature extraction. Some information may be lost, as with fuzzy or saturated image, but the system can now advise the inexpert user.

The system can also more rapidly train new technicians, without the intensive or exclusive attention of an instructor. Thus iFAST automation can minimize training time and effectiveness. The system can be capable of showing the medic when the probe is positioned properly and possibly give guidance when confidence level is high, i.e., where to set an M mode scan for lung point (with many comet tails), when B mode looks good (e.g., rib shadows to left and right), move probe up or down depending on rib shadows. Furthermore, the system can provide textual advice (e.g. positive/negative HTX/PTX or abdominal hemorrhage) and present descriptive diagrams and other help facilities, e.g., where to place the probe (e.g. intercostal spaces), additional points where the invasion is likely to spread if PTX or HTX, models fitted and overlaid transparently on the image to alert the user to possible inclusions. The system can also highlight comparisons between a previous image and a present image, advise when an image has low contrast (e.g., change instrument setting), and advise if a probe is not functioning properly. Moreover, the system can display clear instructions on calibration if "Help" is pressed, and provide context-sensitive help displayed for other assistances.

In addition, prediction accuracy can be significantly increased. Intelligent image processing and motion analysis can considerably improve the prediction of tissue damages to lungs and abdominal organs. Moreover, ultrasonic means are being rapidly adopted in the past several years by civilian heath providers, as a general medic's "toolbox" for early diagnosis. With true diagnosis feedback from expert users, the expert system can continually train itself and adapt to the particular operating environment, such as a new monitoring procedure during helicopter transport.

From forward military medic units to hospital ICUs, the algorithm, as embedded in suitable ultrasonics hardware, can provide for frequent monitoring of an internally bleeding patient, with at least the following FAST exams: right upper abdomen (e.g. Morison's space between liver and right kidney), left upper abdomen (perisplenic and left perirenal areas), suprapublic region (perovesocal area), sub-xyphoid region (pericardium), second intercostal space, and mid-clavicular line. Other possible examinations include 2nd-4th interspaces in mid-clavicular line, followed by 5th-8th in the anterior axillary line, as well as bilateral comparisons of potential hemothorax and/or pneumothorax. Civilian injuries can similarly be readily examined using the system. Hemorrhaged blood due to auto accidents, sports injuries, severe falls, for example, can be detectable by the system, and automated interpretations of the imagery can be made in real time to aid the examiner.

An embodiment of the invention includes a method (e.g., using the iFAST) having high-speed routines for detection of dangerous air or blood pockets. The method also applies non-obtrusive cueing processes, including highlighting of critical features in the ultrasonic imagery, red-yellow-green alert boxes, and textual diagnoses of each frame. The latter can include instructions to improve the acquisition, such as recommendation to move the probe so that more bones are seen. While each frame can be tentatively diagnosed, the algorithm can wait a certain number of frames until quorum votes are exceeded on deciding features. A diagnosis can then be produced on the user's screen.

For faster image segmentation, hand-crafted image processing algorithms can be employed. To reduce image processing load, segmentation can be limited to regions known to be discriminating, such as bands above and below an estimated pleural interface, if detected, where texture contains barcode-like areas. Detection of granular textures below the pleural line can be especially discriminating.

The typical approach to training or tuning using statistical classifiers may require large amounts of samples and may not facile in adapting to changing conditions affecting imaging data collected. Moreover, hierarchical classifiers which can be applied to the decision logic herein described may require very much more data and be even more brittle or insensitive to change. These classifiers may be slower than necessary due to the need to back-propagate adaptive or learned changes from lower level statistical classifiers to higher in the hierarchy. For capability to process at least 5 frames per second, a decision tree type of expert system can be used where each node in the hierarchy can be an autonomous decision-maker or "knowledge expert" as in common parlance.

Thus with a streamlined computer vision technique, reduction of data volumes and computational times makes possible tracking of individuals' measurements from the trauma site to the ED treatment center. The method also entails innovations with regard to feature extractions from B mode ultrasonograms, particularly with respect to lung sliding, comet tail, and other signs of pneumothorax.

The following discusses a method for the identification of pneumothorax according to an embodiment of the invention. As soon after injury as possible the first step in diagnosis can be to obtain scans at various points on the chest using one of various sensors: a linear, high-frequency probe (5-10 MHz), or phased array mode or curvilinear probe mode or other which provide video imagery of the region (chest or abdomen).

These sensors and instruments can provide what is known as Basic Mode, or B mode, which images a 2-dimensional plane through the body. Seeing some signs of air to be discussed, a second step confirms air in the lungs or pneumothorax in what is known as M mode, for "motion," where the probe is held as stationary as possible over a region usually between two bones and parallel with the body midline. The beam can be focused so that return signal is summing over the center plane of the probe. Since the probe can be held steady, the returned signal can be processed to form 1-dimensional depth patterns. Fluctuations in features of these patterns, to be described, then indicate movements of the tissues as they cross the plane particularly when the patient breaths. M mode can be displayed as a vertical line which travels across the screen with time to produce a two-dimensional plot, but here where the horizontal axis is time instead of lateral position as in B mode. The M mode exam can be taken over several breaths so that movement of lung tissue can be clearly seen in negative PTX. But when there are only seen several irregular horizontal lines of peak intensity this indicates only reflections from air with no lung tissue detected. This is described after the following discussion of B mode.

In B mode or a similar scanning mode for either a pneumothorax or a hemothorax, the algorithm first attempts to locate ribs and shadows beneath them (sound can be reflected highly from upper rib surfaces). In other words, the algorithm attempts to identify rib bone features in the images by segmentation of their "shadows", which are long, dark blobs that extend vertically below the rib location (the rib image is a roughly circular, dark blob in the upper portion of the shadow). Between shadows the pleural interface can be located as a relatively bright band of reflection running just below and between the ribs. It may be preferable to have two ribs as a reference, as it can be complicated to locate the pleural interface without this additional evidence due to other bright lines which may appear. If one or no ribs are detected, the algorithm generates a request to move the probe up, or down, or orient it perpendicularly to the ribs as need be. This can be a part of iFAST's "tutorial" function, to help relatively novice users apply the ultrasonography. Given one or no bones detectable, nonetheless iFAST can be capable of continuing to analyze the imagery.

The algorithm can follow the BLUE Protocol which is summarized by a decision tree as shown in FIG. 1. In at least one embodiment of the invention, A profile means predominantly A lines, B profile means predominantly multiple anterior diffuse B lines, A/B profile means predominant A lines on one side and B lines on the other, C profile means anterior alveolar consolidation, and PLAPS means posteriorlateral alveolar and/or pleural syndrome. The upper-most decision "Lung Sliding" can be a combined phenomenon including rapid movements of peaks of intensity along the pleural line, to be referred to as "ants" and "ring-downs". "Ring-downs" appear as short, roughly triangular interference patterns just below the pleural line. Unlike single-slit interference patterns there can be little periodicity evident in the ring-down triangular area, so one may not fruitfully apply a discrete Fourier transform, or wavelet transform, or similar transform. Ring-downs can be estimated by local correlations or by fitting of small triangular masks, or other traditional image processing means. In addition to ring-downs, a healthy lung can have intensity peaks moving along the pleural line, rapidly and erratic, suggesting ants crawling to and fro across the pleural line as they do when traversing a trail. So this feature can be called "ant movement." In order to gain a better estimate of ant movement, a registration of sorts of pleural lines between frames can be obtained by autocorrelation in a bands closely surrounding the lines in both frames. Then in estimating ant movement the preceding frame can be moved over the distance corresponding to maximum correlation.

Ring-downs may not appear below most peaks as a rule, and may appear where there is no peak. Ring-downs may appear just under a low point in pleural intensity. Again, the trained human eye can pick out such highly variable patterns, and it may not be difficult to "train" the counting and voting of various combinations of ants and ring-downs over a period of sufficiently many frames that a high-certainty decision can be made that lung sliding is present or absent. Counting and voting processes is discussed below.

As the top-level decision in FIG. 1 shows, if lung sliding (1) is not thus detected, evidence for three other features can sometimes be sufficiently strong to confidently predict PTX or HTX. One such are so-called "B-lines" which are irregular ray-like features extending all the way from the pleural line down to the bottom of the image. "Z-lines" are similar to B-lines, but do not reach to the bottom of the image. Another is known as "A-lines" which are usually several bright reverberations spaced about the distance between the skin and the inner chest wall. If only A-lines are seen, this is called "A-Profile" or if only B-lines, then as "B-Profile." As indicated to the right (2), A-lines evidence missing or partially missing lung tissue. When there is partial lung sliding, say on one side of the image and A-lines dominating the other side, this pattern is called "lung point" (3). Here the lungs are just beginning to pull away from the inner chest wall. Between the lung sliding or B-lines and the region of A-line dominance is the point where the lungs are beginning to pull away from the chest wall. Where the lung has completely separated, only the A-lines are generally seen, corresponding closely to the "stratospheric sign" seen in M mode, and indeed due to the same underlying reverberative phenomenon between the outer pleural membrane and the chest skin or other reflective interfaces like fat-muscle, or skin-fat. An examination can be made over several points on both sides of the chest to determine the extent of any lung separation particularly in the case of blunt force trauma since lungs could collapse on both sides.

Strong indications of air or fluid in the pleural interface generally are considered a danger for which intervention should be as prompt as possible. If there is time, and uncertainty raises the need to gain added evidence before a drastic procedure such as needle decompression or thoracotomy, or a transport via stretcher and helicopter may be called for, then the practitioner may switch the probe and system to M mode to examine the region more closely.

Figure 2:
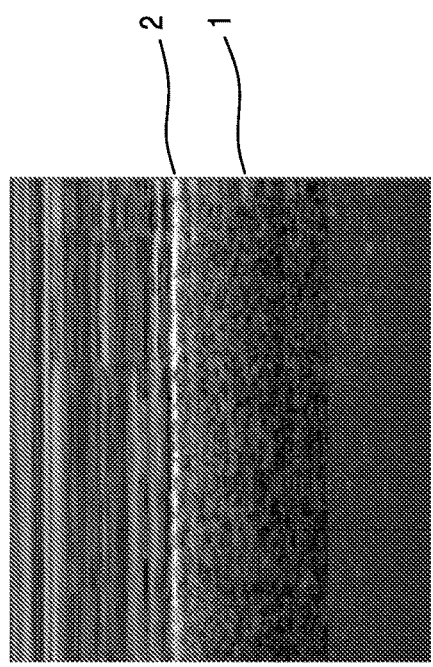
FIG. 2 illustrates ultrasonic imagery showing M mode characteristics of negative pneumothorax according to an embodiment of the invention.

In M mode, FIG. 2, iFAST can make use mainly of three image features: "sandiness" (1) below the pleural interface (2) appearing as a dominant curve of maximum intensity generally termed "seashore", also sliding signs called "barcodes" (much like patterns on store labels) only faintly seen in FIG. 2 both above and below the pleural interface. This type of image can evidence negative PTX. Alternately if there are present numerous larger horizontal curves of intensity maxima, as in FIG. 3, there is likely to be a positive PTX. The latter is called the "stratospheric" sign referring to layered, thin stratospheric clouds as one might see on a calm evening. But as shown in FIG. 4, smaller barcodes can appear with healthy lungs as well. These are smaller and less numerous than with positive PTX, and appear below the pleural line (1). FIG. 5 compares positive and negative PTX as obtained by iFAST.

Figure 6:
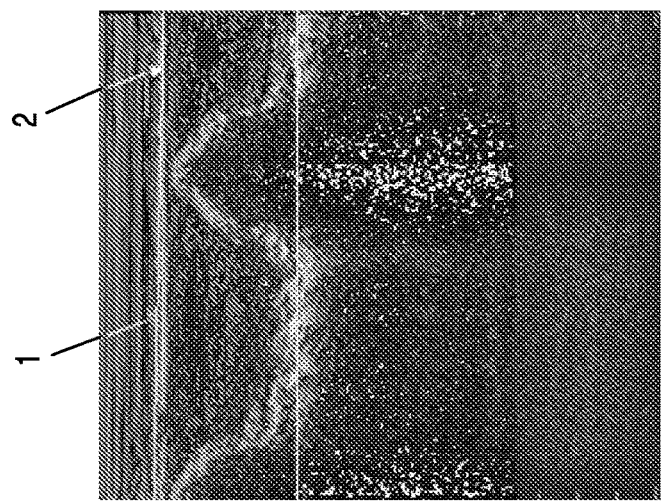
FIG. 6 illustrates ultrasonic imagery showing a hemothorax sinusoid pattern in M mode according to an embodiment of the invention.

FIG. 6 shows obtaining M mode scans over several breath cycles. In this example, blood is pooling for a time below the left arrow (1), then sloshing out of the M mode plane, and then back (2).

For abdominal scans, iFAST can operate well with non-colored ultrasound. Where there is likely to be rapid movement of fluid in a cavity, then "colored" (or Doppler) mode could be used. Here, rapid movements can indicate blood spurting from a vessel, or sloshing in a cavity as the patient is rolled gently from side-to-side. As a hemorrhage grows there may be points where blood is entering the cavity, rapidly through broken blood vessels. However, the iFAST algorithm can detect reverberations within cavities where there would normally be tissue, in combination with fit of an appropriate model of the inter-organ space.

Figure 7:
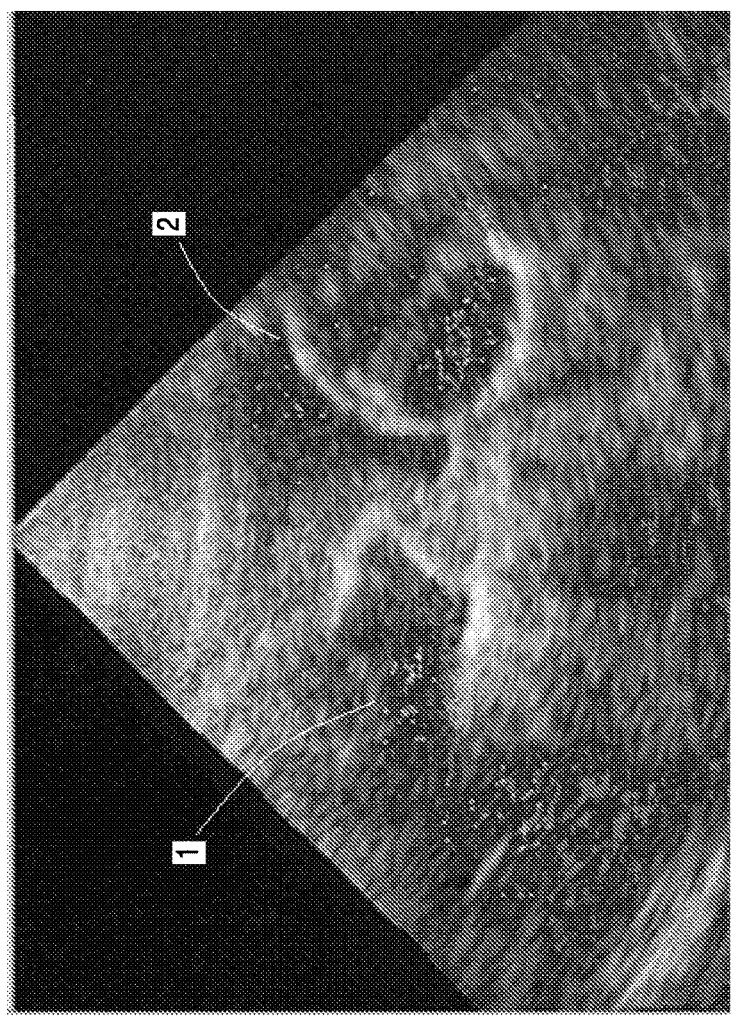
FIG. 7 illustrates ultrasonic imagery showing cellular automata detecting blood in abdomen according to an embodiment of the invention.

Models of these spaces can be geometrically more complicated than that of the pleural interface (i.e., line between two bones). For example, the model of the space between the liver and the kidney of a supine patient is an approximate wedge-like shape, as in FIG. 7, which is quite thin in a normal patient, but the wedge becomes increasingly thicker as blood enters the space (1) (Morrison's Pouch). Note there is blood evident in other spaces in FIG. 7, not untypical of a severe traumatic injury to the abdomen. The preferred wedge model for Morrison's Pouch is a 4-sided polygon which has 8 parameters to fit. This can be done rapidly as the user at first indicates the type of region, and optionally may speed up the computation by aligning the model, as an overlay over the frames. The fitting stops when convergence indicates that the model covers with about 80-90% of the suspected blood pool area. Then a procedure described next determines how much of this area is likely to be blood, and this method is not sensitive to 10-20% mismatches between model and real areas.

Blood in a wedge or other known shape can show distinctive interference patterns, often at certain focal points of maximum intensity, further complicated in shape by floating particles or bubbles. As an analogous phenomenon, consider a bird bath or small round pool, and tap the water near the edge (as ultrasound would do in smaller scale). Surface waves set up a standing wave pattern depending on how fast one taps. On flexible solid surfaces, this is otherwise known as a drum head pattern, caused by standing waves intersecting in a number of directions. Given a wedge-shape the directions of intersection are roughly perpendicular to the relatively flat sides of the wedge. The algorithm therefore can search for one of a few basic wave intersection patterns known to be likely to be present for the particular space between two or three selected organs. The region can be selectable on the user's screen via a drop-down menu or radial buttons.

Instead of a wavelet transform or similar, the system can use a type of cellular automaton. Many of these can be initiated at each peak and computed in parallel. Each automaton can explore structure(s) surrounding a peak with a number of "move rules" looking for edges horizontally, vertically, and in some cases, diagonally, much as in a game of tic-tac-toe. The particular rules used by an automaton can include: starting from a "seed" point with peak blood intensity step up and right until a bright edge is detected and mark this for further steps. Then look to the left. Then up, then down, etc. At each newly detected edge, perform the same set of moves recursively. In one embodiment, edges of vertical, horizontal and 45 degree orientations are sought. The automaton uses weights in deciding which way to search, which depends on the ad hoc or prior knowledge of the type of tissue interface, which can be input by the user and received by the system.

In order to get best estimates of pleural interfaces, bones, and the various radiating patterns (A-lines, B-lines, Z-lines, ring-downs), a tracking estimate of the bright line can be obtained, with A-lines and B-lines as well if the CPU power is sufficiently great to reach a minimum acceptable "near real time" rate (e.g., greater than 5 Hz). Below this rate, the flickering and jumping may distract the user. Instead of clustering or sorting means, which can slow the frame-by-frame processing, the iFAST modules can rely on histogram counts of significant vertical (with linear probes) or radial (with other probes) the A-lines, B-lines, or Z-lines. Radial lines can be estimated for non-rectangular modes such as curvilinear and phased array probes. Especially the B-lines and Z-lines can tend to flash about wildly, so that clustering of these may not be useful were this attempted.

According to the BLUE Protocol in at least one embodiment, if the A-Profile is seen (a number of A-lines are seen by themselves) and these remain fairly stationary through several breathing cycles, this is considered conclusive evidence for a PTX. If on the other hand, A-lines are seen on one side, but lung sliding or B-lines dominate the other (B-Profile) then the prediction can be "lung point" (a partial PTX where the lungs are beginning collapse but still adjacent to the inner chest for part of the pleural interface). A histogram can be performed in the vertical (or radial) dimension for linear, respectively curvilinear, probes. The histogram can count distances between peaks, so presence of a dominant line in the histogram can indicate a large percentage of equally spaced lines. This can be denoted "reverberations" by sonographers. Such a distance-histogram can be a much faster indication of underlying reverberations in the presence of much noise than a discrete transform of any kind. The latter, as a class, can involve time-consuming correlations of a given set of "fundamental" wavelets or other shapes (e.g., hat functions, monkey saddles, etc.) In at least one embodiment, the lines tend to follow closely a vertical or radial orientation, so it is not necessary to compute edge histograms at all different angles and positions, e.g., as with a Hough transform. Such can be quite more computationally demanding than these narrowly crafted procures.

In "radial" scans, such as sector scan, curvilinear probing, etc., there can be one point near the top of a frame which can be considered a radiative source or "center point", which can remain stationary in frames of most instruments. The horizontal coordinate of the center point in the image can be half the distance between the usable left side and right side, for most instruments. The vertical coordinate can be at the upper limit of the image for the radial modes, or somewhat above it, depending on the instrument and its settings. Since there may generally be a slight curvature of the pleural line, concave upwards, even with linear probes a center point can be set where the vertical coordinate is one or more times the height of the image; thus effectively vertical.

Some instruments have gain controls which can be taken into account when estimating vertical or radial features in frames. Typically standard on instruments are three controls: one for gain in the upper half of the image, one for gain in the lower half, and one for overall gain uniformly from top to bottom. In at least embodiment, the gain control signals are provided to the algorithm so that it can apply its horizontal (or radial) edge filters for pleural line, B-lines, A-lines, etc., with adjusted supports.

In at least one embodiment of the invention, certain thresholds can be adjusted for parameters such as overall image intensity, variance of image intensity, image height and width. The tuning of such thresholds can become easier and more effective when these gross image parameters are taken into account, and re-measured for each image or frame at the beginning of the video sequence. For example, a horizontal, more or less linear feature should have its threshold of detection set in proportion to horizontal extent of the image region of interest, as say, distance between two bones, or a bone and usable edge if no bone is seen at the other side, or just between two edges of usable image area (most instruments produce borders with text, or solid colors, which are not useable).

In at least one embodiment, a search is made from left toward center of the image for where a more or less solid color disappears and natural image variability begins, for the left margin, or top. For the right or bottom margins, this can be reversed where a search can look for end of variability and beginning of solid color, sans a few pixels which may be due to textual annotations on most instruments. A three-quarters or nine-tenths vote over a set of a dozen equally spaced pixel coordinates can accurately detect a transition from more or less constant to varied pixel intensities. This capability can also be useful in detecting the transition from B mode to M mode, or back, even where a transition signal is not available from the instrument. In at least one embodiment, image margins for radial imagery are detected in an analogous manner but where the left and right margins are radial instead of vertical. For curvilinear and sector scan transducers, it may not be necessary to detect the upper margin, for a reason to be described next, and lower margins can be circular. The margin computations can only occur once (e.g., at the first frame of a video) since the instrument can hold these constant.

To achieve an acceptable frame rate for large frames (e.g. in the range of 30×500 on a dual core processor), the searches, histograms and horizontal edge correlations can be limited to a smaller region bounded by an upper line and a lower line, and by left and right bone shadows (if any). The upper line, in B mode, can be below about one half the estimated bone diameter, while the lower line can be just about where the image fades to about a twentieth of the average pixel intensity (due to inappropriate gain settings) as a rough heuristic while others could be acceptable. Within this box a considerable speedup of the feature extractions may be achieved. The B-line extractions can be extended to a usable bottom (even if somewhat faded). It can be determined if these phenomena do indeed reach the edge of the bottom image, as then they can be reflected by deep lung tissue, which can indicate that there is some lung tissue below the large reflection above the pleural line.

In imagery, several approximately horizontal curves of relatively high intensity can frequently appear with healthy lungs. Some may be muscle layers, fat, or A-lines. However, the latter can be equally spaced of about a centimeter, as reverberations between the skin and the air of a PTX. Nevertheless, the algorithm can automatically discriminate between various curves of peak intensities in most cases, so it goes ahead with the analysis even if only one or less bones appear. A bone pattern can include a relatively bright upper edge below which there can be a dark "shadow" (the sound does not pass well through the bone). Occasionally the pleural line can extend under the round pattern, presumed to be a bone. The actual pleural line may have a smooth curve and can be relatively linear or circular compared to other bright curves due to muscles, fat-muscle layers, etc. Once a pleural line, delineating the pleural interface, is obtained with a minimum "certainty factor", the analysis can proceed to look for signs of "lung sliding" (i.e., top-most box of the Decision Diagram).

A routine to detect bones can use two or more standard edge filters. The smallest can have weight or support approximately the width of an average bone. One larger can be taken to have twice this width. Thus, natural variability in bone dimensions can be discerned adequately when either the narrow or the wide filter has a zero-crossing. One embodiment rejects the assumption that a zero crossing can be clearly detected, due to the large amount of noise and movement in these images even with tracking.

"Lung sliding" can be somewhat difficult for a computer-based algorithm to determine, since it is a combination of one or more specific patterns which the human eye can be trained to distinguish, but with which novices may have some difficulty. Textbooks typically note that one sees side-to-side sliding movements of the pleural line, "obviously" due to slipping of the inner pleural membrane against the outer. However, not so obvious may be a variety of image patterns that are extracted and analyzed.

Pleural interface surfaces are typically not smooth. There are typically small air bubbles and fluid pockets, no blood in healthy people. The surfaces of the membranes can be variegated, so that rapid, small separations of the pleural surfaces may be expected. In at least one embodiment, slipping gives rise to blobs of peak intensity which are from 0.5 to 1.0 centimeter wide generally, and about the wavelength of the sound (its resolution) in thickness, as one views a video sequence. Another feature, which can greatly increase certainty of a healthy pleura is called ring-downs. These can be approximately wedge-shaped interference patterns that extend internally from the pleural line from 1 to several wavelengths. They can occur very rapidly, and disappear as rapidly. While they can be associated with the peak intensity, this is not always the case. A ring-down can occasionally extend below a minimum of pleural line intensity, rather than a maximum. The algorithm can thus search for both peaks and valleys across the pleural line. One or two bone shadows may clearly mark the ends of the pleural line.

Physiologically A-lines can arise when sound reverberates between regions of relatively high impedance gradient, such as the inner lung surface and the skin, which is the usual case. Thus, a healthy lung can show a few such vibrations in limited vertical sectors about a centimeter or two apart depending on the patient's chest. However, if most of the frame is "dominated" by several almost-equally spaced lines of peak intensity of one or several centimeters separation, then an inference can be made which sets a value indicating the presence of A-lines to be "true" or "1" or some other computational signal. These values, as with those of B-lines and lung sliding can later be used in a summary diagnostic process to alert the user, as discussed below.

As indicated in the Decision Tree Diagram, if lung sliding is not detected significantly, then the algorithm can search for B-lines (otherwise known as Comet Tails). This can be a reverberative phenomena between the pleural interface and air-liquid pockets on the inner surface of the lungs (e.g., alveolar sacs, etc.). The "reverberations" can be more akin to the speckle of a laser beam as it penetrates a box of glass marbles. The peaks along a small number of radial lines running through a given B-line can be counted (e.g., ten lines). A histogram of the counts along these lines across a given frame may then show clusters where the peak counts are high, e.g., more than 10 peaks over 100 pixel line lengths. If several strong clusters are extracted, the algorithm can indicate that there are B-lines (e.g., a Boolean value=true). Generally, it can be found that up two to three clusters can set are B-lines true; while more than three clusters sets an additional Boolean, lungRockets=true.

In regards to combined profiles such as A/B-Profile and Lung Point, depending on the noise level, one may need certain minimum significant extents of the phenomena constituting these profiles. Essentially, the autocorrelation function can provide a minimum significant length in each case.

Z-lines can be radially or vertically reverberative patterns that can be shorter than B-lines. The latter can be cibsuderede to extend the entire length of the image from pleural line to bottom of the usable image; whereas Z-lines may be useful as features if those which are shorter than one-half this distance are counted. If there are more than 3 B-lines and a significant number of Z-lines, then the inference of "lung rockets" may be made. The lung-rockets image can appear somewhat like the blasts of the three Space Shuttle engines in its first stage before the two booster rockets separate, hence the term. For a fast computation, a count of the number of peaks along the vertical or radial lines sampled can suffice where a learned threshold is adapted to correctly predict such a massive set of reverberations. A few Z-lines by themselves can be normal, hence they can be ignored. In the presence of several B-lines, and in large numbers, these can be indicative of conditions like empymia, consolidation, edema, and cancer.

Spaces around the heart, between the kidneys and liver, between liver and spleen, and between kidneys and spleen can be material for instruction of trainees. These spaces in a supine patient can be regular and characterized well by polyhedral of three to five lines. Thus, in at least one embodiment, there can be from six to ten parameters to be varied in a search to fit a model to a given blood pocket, but due to the slowly curved surfaces between these organs and around the heart, the straight line approximations can be good after a dozen or so iterations, that is, within 80 to 90% of the area of the real blood pool.

Figure 8:
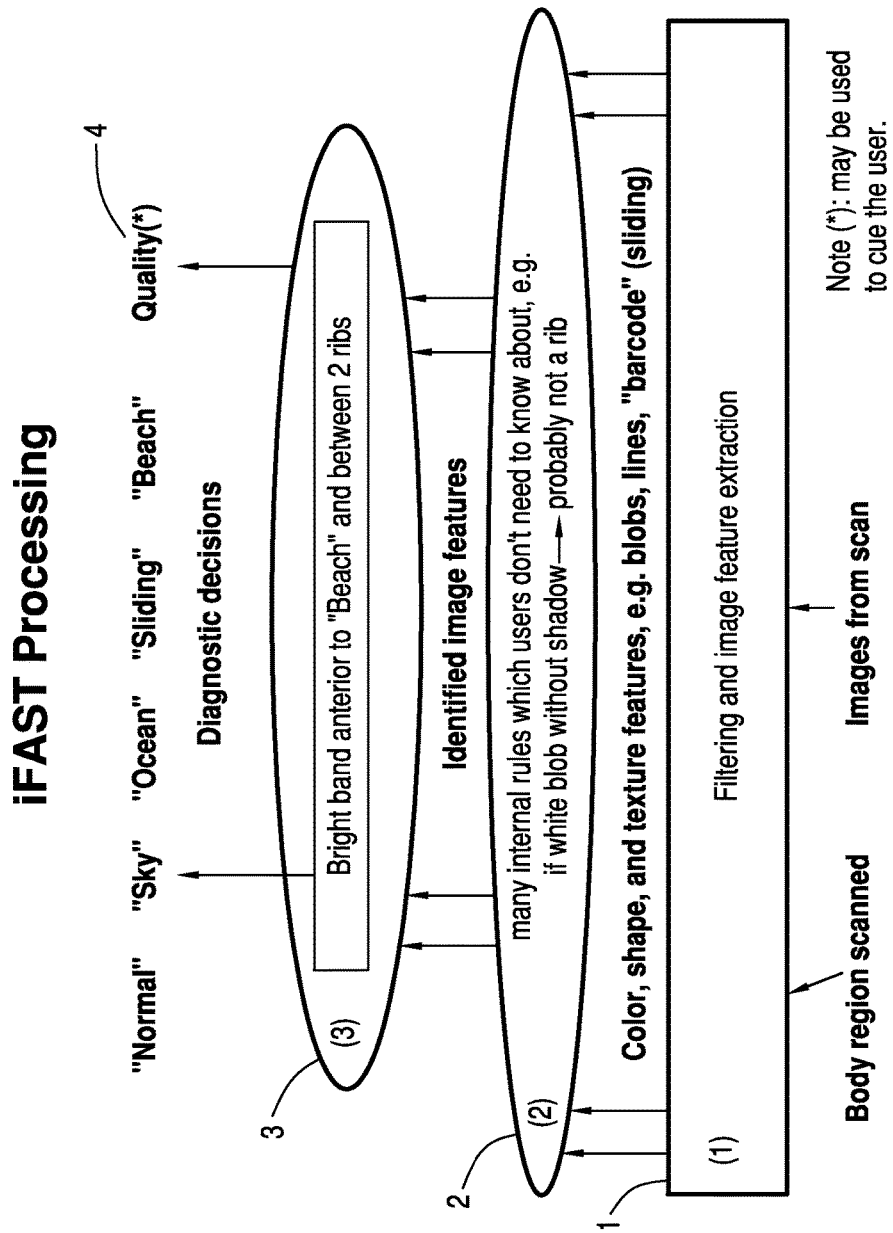
FIG. 8 is a flow diagram illustrating iFAST processing according to an embodiment of the invention.

In at least one embodiment of the invention, the image processing algorithm includes three stages, as illustrated in FIG. 8. Stage 1 includes receiving images from a body region which has been scanned and performing filtering and image feature extraction of the images to generate at least one of color, shape and texture features. Stage 2 includes receiving the generated features and applying internal rules to identify specific image features. Stage 3 includes determining potential conditions meaningful to the technician or doctor and a quality score (4) assessment as a certainty factor, approximating a statistical confidence level heuristically, which may be used to cue the user with some form of color scheme. For example, red for high certainty of disease, green for high certainty of no disease, and yellow for in between.

At least one embodiment of the invention includes high-speed routines for detection of image or video frame-by-frame features indicating dangerous air or blood pockets, largely departing from traditional image processing methods and hand-crafted for specific features. Methods for these are illustrated in FIGS. 9A-9D. The system in at least one embodiment can apply non-obtrusive cueing, including the highlighting of critical features in overlays upon the ultrasonic imagery, alerts such as red-yellow-green boxes, and/or textual diagnoses of each frame. Textual cues can include instructions to improve the acquisition, such as a recommendation to move the probe so that more bones are seen. While each frame can be tentatively diagnosed, the algorithm can wait a certain number of frames until a quorum of votes are obtained on inferences from features, and a prediction can be immediately presented on the user's screen, e.g., whether positive or negative PTX, HTX, or abdominal hemorrhage.

Figure 9A:
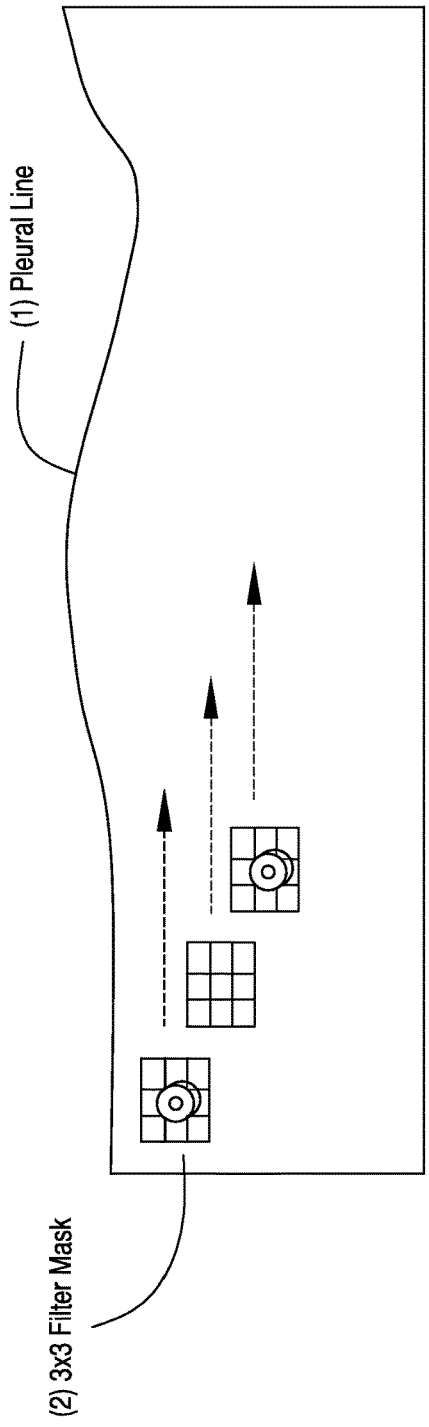
FIG. 9A illustrates the selection of peaks in a region below a pleural line with a filter mask according to an embodiment of the invention.
Figure 9B:
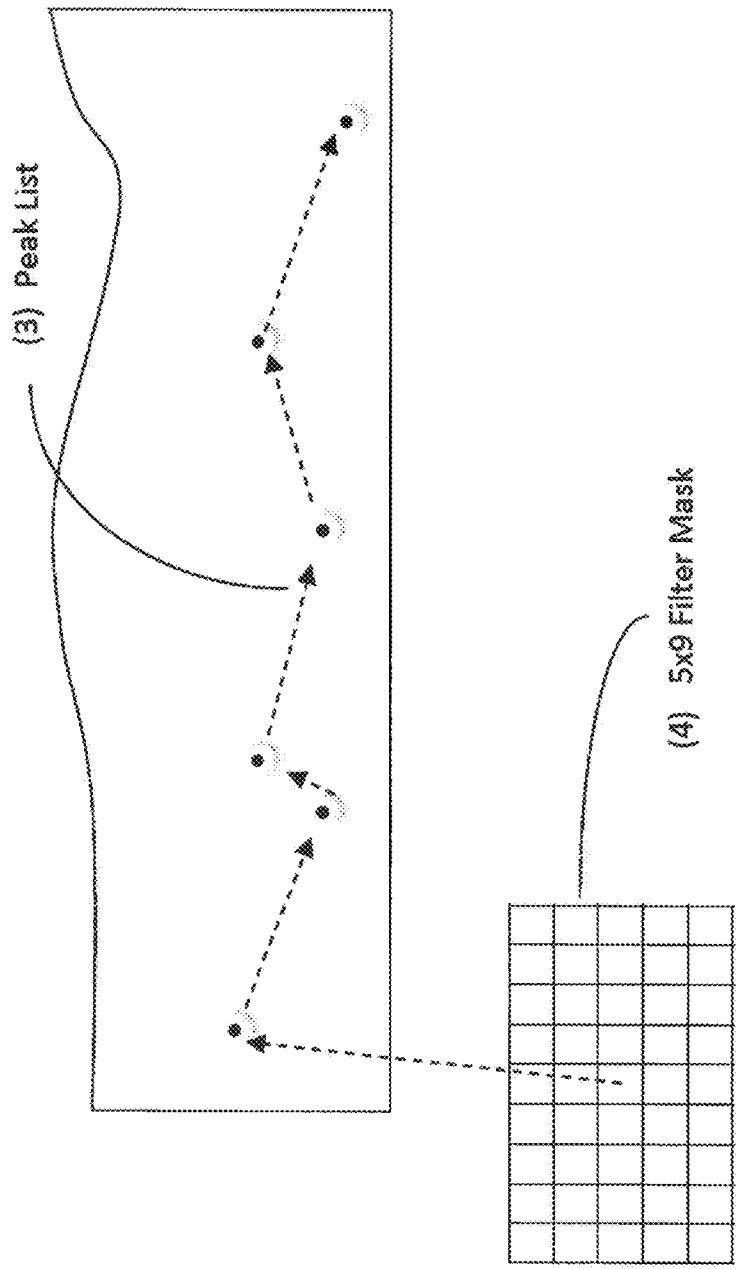
FIG. 9B illustrates the application of a filter mask to each peak according to an embodiment of the invention.

As mentioned, hand-crafted feature extraction algorithms can be employed for faster image segmentation. To reduce image processing computational load, expensive line and blob segmentations as traditionally applied can be tightly to regions known to be discriminating, such as bands above and below a putative pleural interface, if detected. Especially discriminating can be detection of granular textures below the suspected pleural line, and barcode-like textures. In FIG. 9A, (1) indicates a pleural line below which is a region restricted to which a search for peaks is made with a 9-point filter mask (2) creating a list of peaks (3, dashed arrows). If there are too many peaks, a number of the brightest peaks can be chosen, which are called "sand particles". In FIG. 9B, a larger filter mask (e.g. 5×9 pixels) is applied to each peak in the list (4). An even smaller number of the highest intensity of these according to the larger filter mask can be selected as representing "pebbles".

A further method illustrates the speed-up achieved by special crafting, in which features along linear or curvilinear feature lines can be extracted much faster than even with masks or correlation-like model fitting. This method can compute inter-feature distance histograms along the curve (note, 1-dimensional, instead of 2-dimensional as in filter masking) feature regions, and seek one or more peaks in these histograms. If there is periodicity, one peak will dominate. In at least one embodiment, this computation far exceeds the speed of Fast Fourier Transform (FFT) techniques, such as wavelet, essentially because no multiplications are required as in basis function correlations of the transform techniques. Moreover, a Hough transform can be excessively complex considering that edges in the ultrasound imagery tend to be horizontal, or angular along a radial, so 2-dimensional edge analysis may not be required.

Figure 9C:
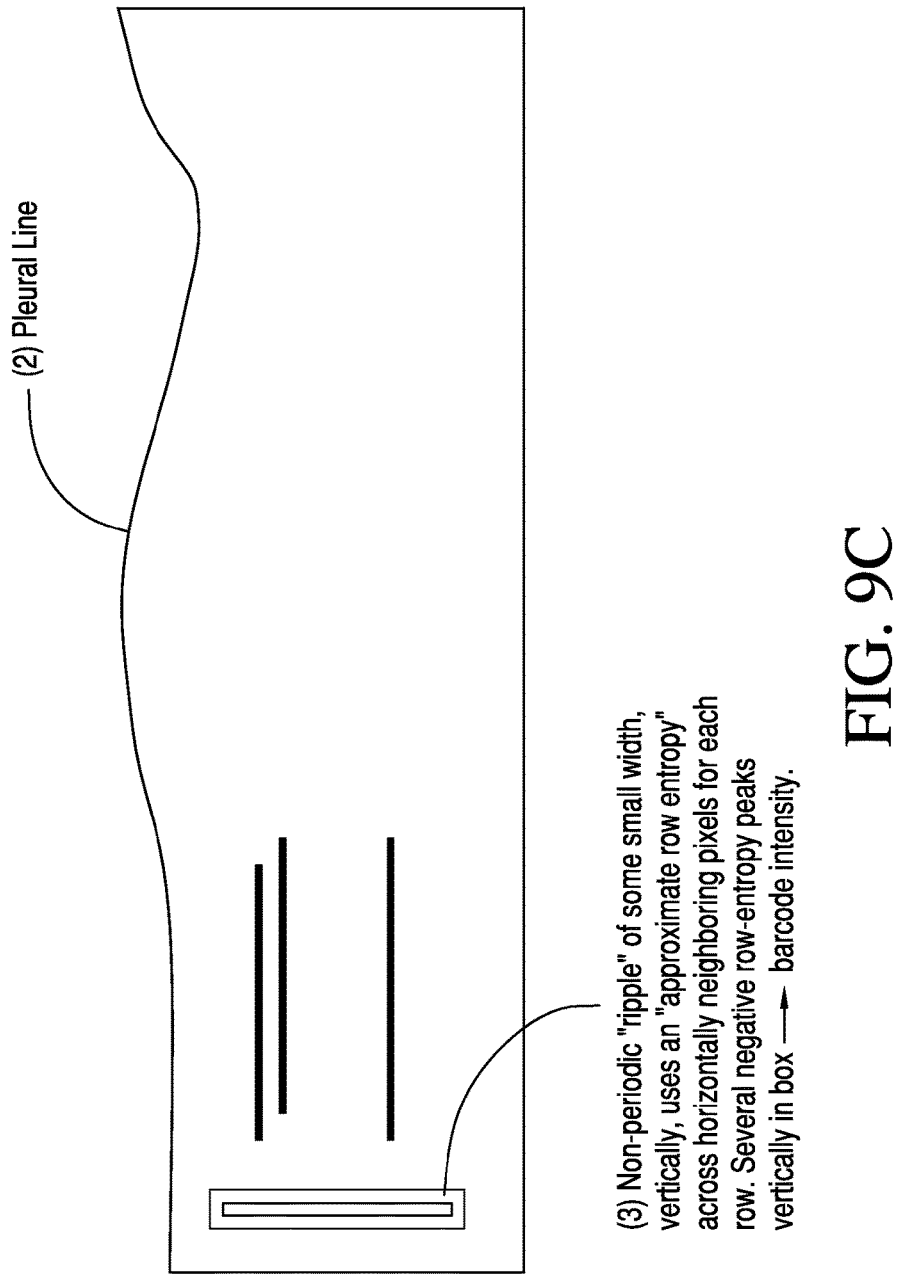
FIG. 9C illustrates row entropy peaks according to an embodiment of the invention.
Figure 9D:
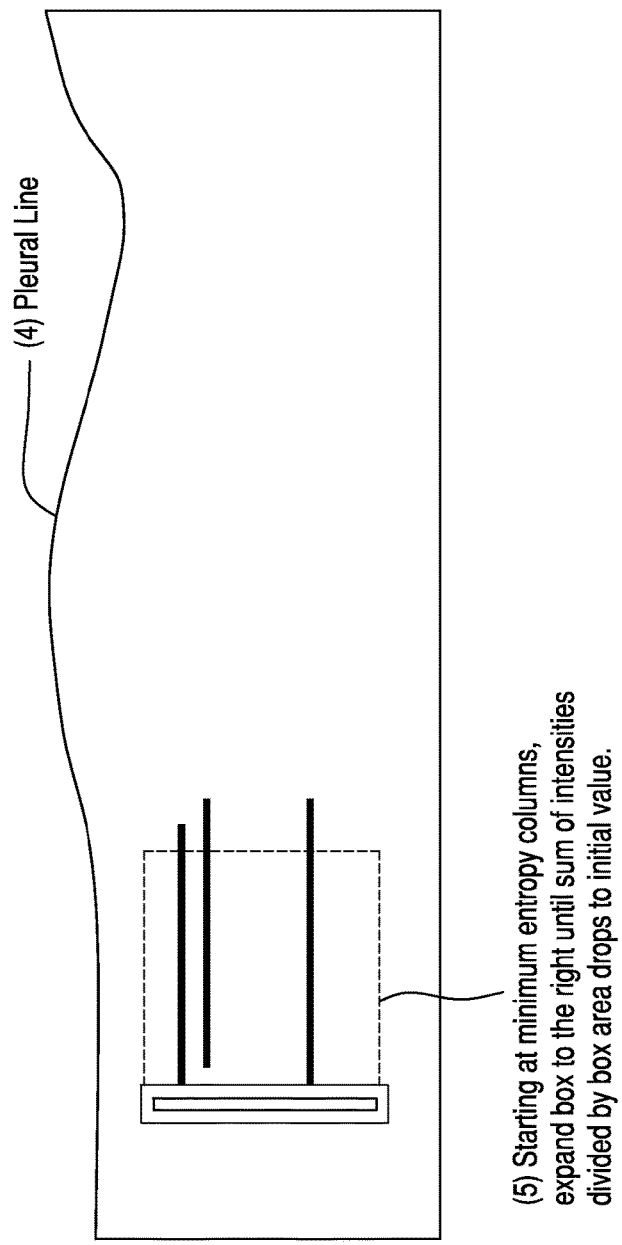
FIG. 9D illustrates a box over entropy columns according to an embodiment of the invention.

The example methods illustrated in FIGS. 9A-9D illustrate the general principles of crafting specialized routines for extraction of punctuated and linear features according to an embodiment of the invention. In FIG. 9C, a non-periodic "ripple" of some small width, vertically, uses an "approximate row entropy" across horizontally neighboring pixels for each row. Several negative row-entropy peaks vertically in box indicate barcode intensity. In FIG. 9D, starting at minimum entropy columns, the box is expanded to the right until the sum of intensities divided by box area drops to the initial value.

Figure 10:
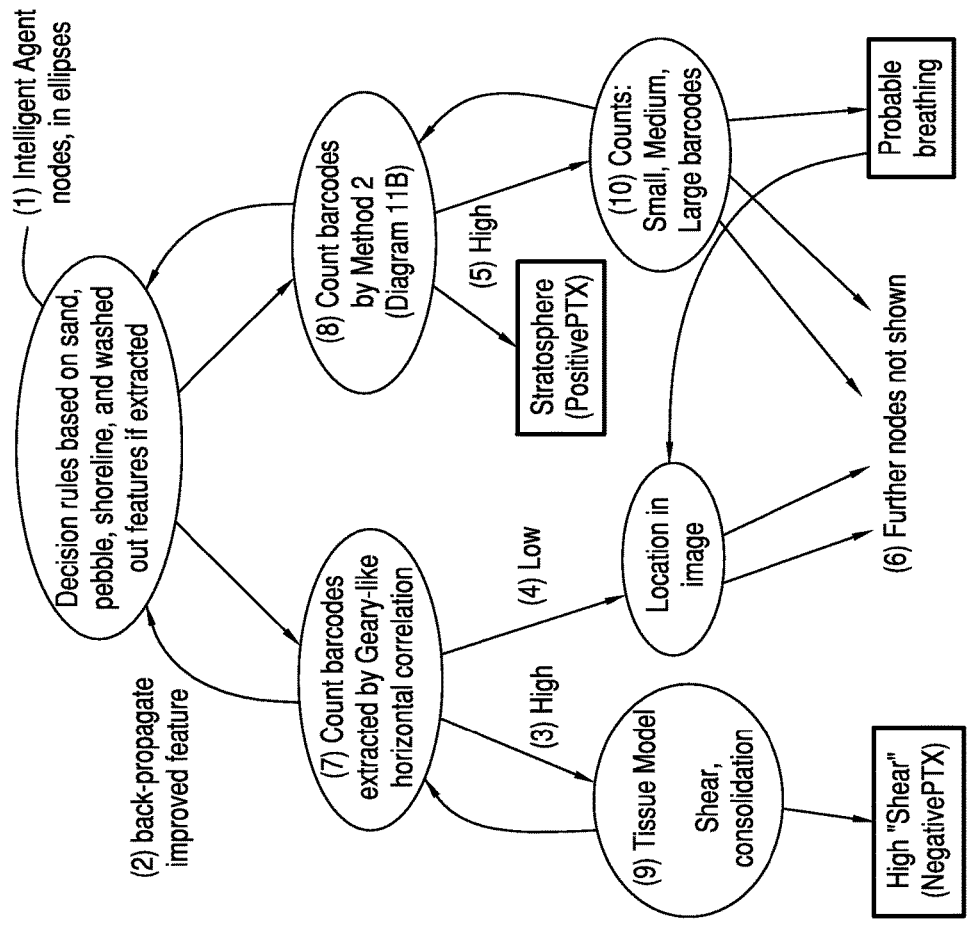
FIG. 10 illustrates a hierarchical expert system according to an embodiment of the invention.

For the capability to process at least five frames per second, a decision tree is used where each node as in FIG. 10 (1) for example is a small forward- and backward-chaining expert system with highly parametrized rules based on a small number of classifiers. A boosting or bagging method can be used to change the set of classifiers, hence the rules. Each node can receive information from nodes above or below, so as to constitute an autonomous decision-maker or "knowledge expert" or "intelligent agent". The principle of this specialized hierarchy can be to defer more complex evidence collection to lower levels of increasing computational complexity until needed, if ever. As soon as certainty for a prediction reaches a "green" indicator, the node expansion plan can be terminated, which can avoid a sizeable set of scheduled tasks of higher complexity. The principle can be that discrimination tasks initiated by each node can be scheduled in the hierarchy in a prioritized depth-first manner, so that deeper, more complex evidence collections (e.g., large classifiers) can follow the less detailed above them in the hierarchy. This can be referred to as "lazy binding" or "just-in-time processing."

So for example, intelligent agent node (7) involves a more computationally intense computation than node (1) where a small Geary-like correlation is swept across the image below a pleural line, if any, which measures the degree of horizontal correlation at a 1-pixel shift to the left and to the right of a given pixel. If the sum of intensities of these correlations exceeds a threshold, wherein the threshold is adjusted over many sample images to be about one standard deviation above the average sum of intensities over these images, then a Tissue Model (9) can be applied which is even more complex, measuring shear movements in tissue under the pleural line, if any, as well as presence of any blobs larger than pebbles, which indicate lung consolidation. This adjustment technique is used frequently in the embodiment, whereby a threshold is adapted over a fixed training image set, or allowed to adapt dynamically as increasingly many new images are obtained using a Kalman filter (which estimates average and variance hence standard deviation) recursively at each new image. The principle of lazy execution can be illustrated by the example where node (7) is scheduled just before (8), but (10) is less complex than (9) to compute; in which case (10) is evaluated first. If a "high" certainty is attained by (10), then the entire computation can stop, and a prediction can be emitted, thus eliminating the cost of computing (7), (3), and (4) and any deeper nodes. That is, the scheduler can work depth-first unless there is a tie at a higher level of the tree, and a jump to another branch may shorten the computation.

Another factor in this tie breaking decision is that the method in FIGS. 9C and 9D is computationally simpler than the Geary-like or Morgan autocorrelation. Avoiding large correlations (e.g., Geary's method or similar), the first step in the method can sweep across selected bands of the given M-mode image with a 1×N horizontal mask, computing an approximated entropy (e.g., using a look-up table for approximations to the log function). The next step 2 can lazily (if called by a deeper node in the expert system) expand rectangles vertically above and below the masks where entropy is low, i.e., where there is little information in the horizontal line segments of length N, that is likely to be a piece of a barcode.

In at least one embodiment, changes in rules and extraction parameters are not made at a given level during the learning phase, until a stable convergence (within set bounds) of parameters has been reached at all dependent lower levels. Parameters and their rules at all levels of the hierarchy can converge, i.e., the training updates will remain structurally stable and discrimination will gradually improve. This is, unless a human curator makes a wrong inclusion of an outlier. To correct such an error, a standard checkpoint and rollback procedure can be implemented. Several curators can vote on any decision to grossly modify the rules structure, where the curators may be located at distributed centers of expertise in ultrasonography. The decision tree nodes can be autonomous decision makers. Curators are system operators with special privilege to approve or disapprove changes to the state of the system's permanently saved data, which includes parameters and settings, mentioned here and others used throughout the software, which determine the shapes and dimensions of image features as they are to be extracted by the segmentation, as well as thresholds and other parameters which determine how logical decisions will be made.

Figure 11:
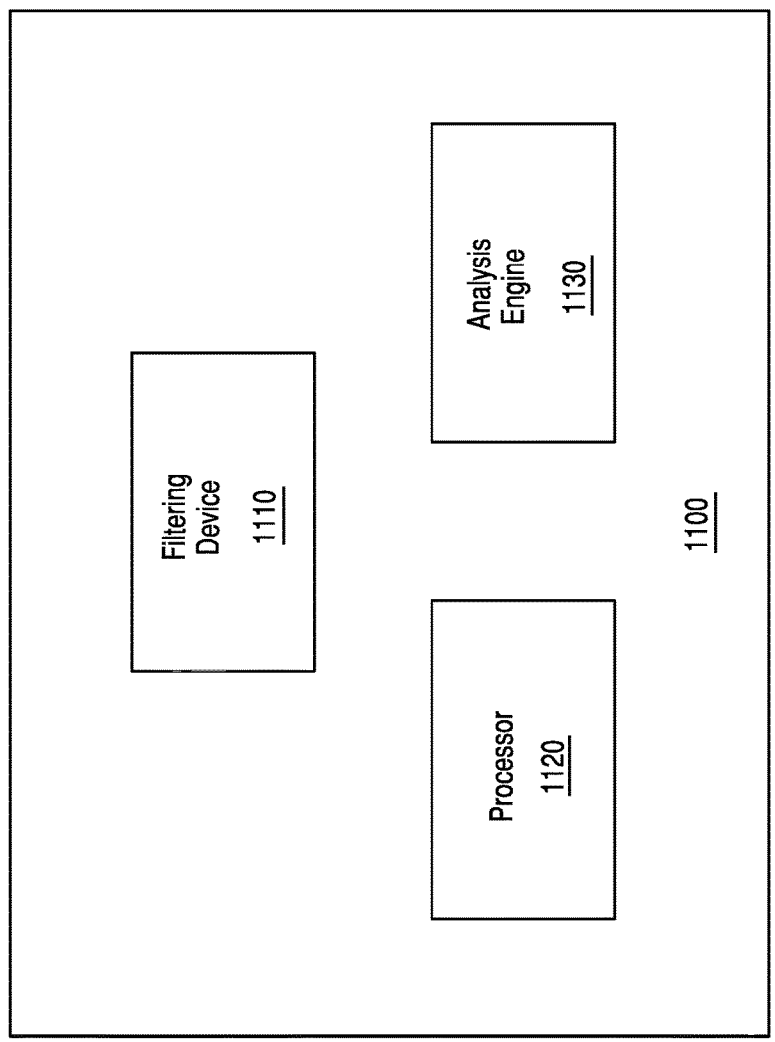
FIG. 11 is a diagram illustrating hardware system components for a system for identifying internal trauma in a patient according to an embodiment of the invention.
Figure 12:
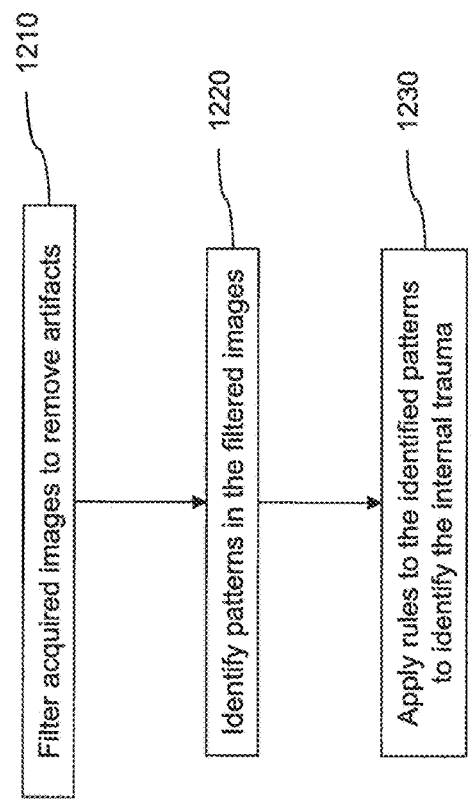
FIG. 12 is a flow diagram illustrating method for identifying internal trauma in a patient according to an embodiment of the invention.

FIG. 11 is a diagram illustrating hardware system components for a system 1100 according to an embodiment of the invention, wherein the system 1100 identifies internal trauma in a patient. The system 1100 includes a filtering device 1110, a processor 1120, and an analysis engine 1130. FIG. 12 is a flow diagram illustrating method for identifying internal trauma (e.g., blood or air in body cavities) in a patient, for example, using the system 1100, according to an embodiment of the invention.

The filtering device 1110 filters acquired images (e.g., ultrasonic) to remove artifacts 1210. In at least one embodiment of the invention, the acquired images can include a plurality of individual frames successively captured from a sonographic video. The artifacts can include streaks, standing wave patterns, and/or instrument noise.

The processor 1120 identifies patterns in the filtered images 1220. As used herein, the term "processor" includes a hardware device in a computer connected to the filtering device 1110. In at least one embodiment, the patterns include an irregular blob fitted to a blood pool, an A-line pattern, a B-line pattern, a lung sliding pattern, a barcode pattern, a sky pattern, a seashore pattern, and/or a beach pattern.

Figure 13:
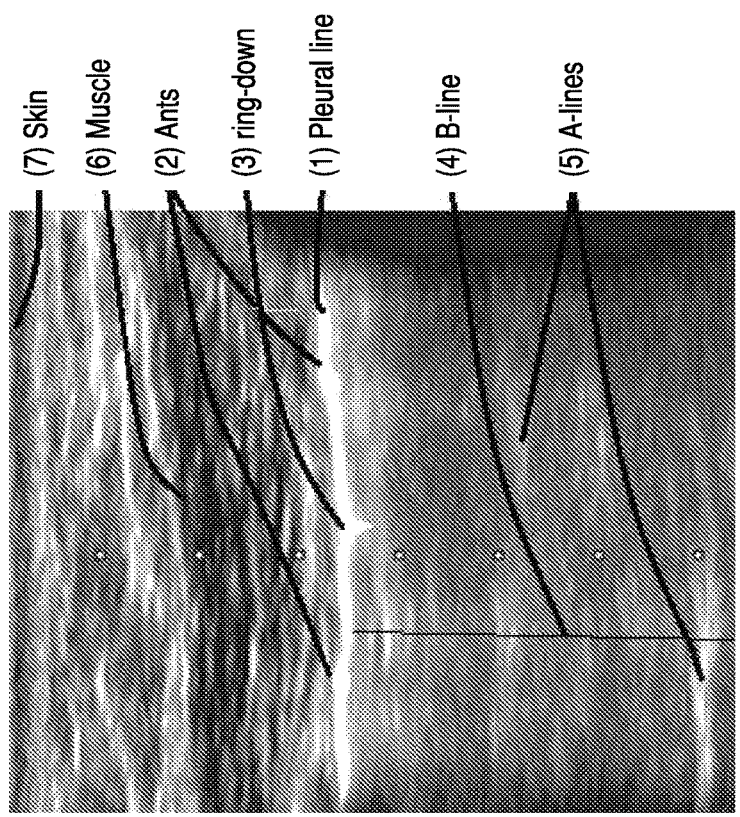
FIG. 13 illustrates a filtered image according to an embodiment of the invention.

FIG. 13 illustrates a filtered image according to an embodiment of the invention. The pleural line (1), or pleural interface, can be a bright, roughly horizontal or radial narrow band indicating probable reflection from the fluid between a chest wall membrane and a membrane surrounding the lungs. The fluid can be a lubricant to aid the lungs in sliding within the chest as the person breaths. In at least one embodiment, ant patterns (2) are rapidly moving peaks of intensity along the pleural line (1); and, ring-down patterns (3) are short, roughly triangular interference patterns just below the pleural line (1). Ring-down patterns (3) may be present due to adhesions between the inner and outer membranes of the pleural interface, or possibly due to a small air bubble (temporary adhesions and bubbles are normal conditions of healthy lungs).

The B-line (4) can be a band of varied bright intensities radiating downwards from the pleural line to the bottom of the image. The A-line (5) can be roughly horizontal, sometimes slightly curved, narrow bands of apparent reflection parallel to and below the pleural line (1). The A-line (5) can include one or more equally spaced lines about the separation between the skin (7) and the muscle layer (6) between the ribs, or about the spacing between the outer muscles (6) and the lungs.

Lung Sliding can be a multifaceted phenomenon including rapid movements of ants (2) and sometimes ring-downs (3) along the pleural line (1). A wedge can be a 3-sided or 4-sided polygonal area used to fit many inter-organ hemorrhages, such as "Morison's Pouch" or hepatorenal space (very wide wedge bounding blood in the pleural interface shown in FIG. 6).

Figure 14:
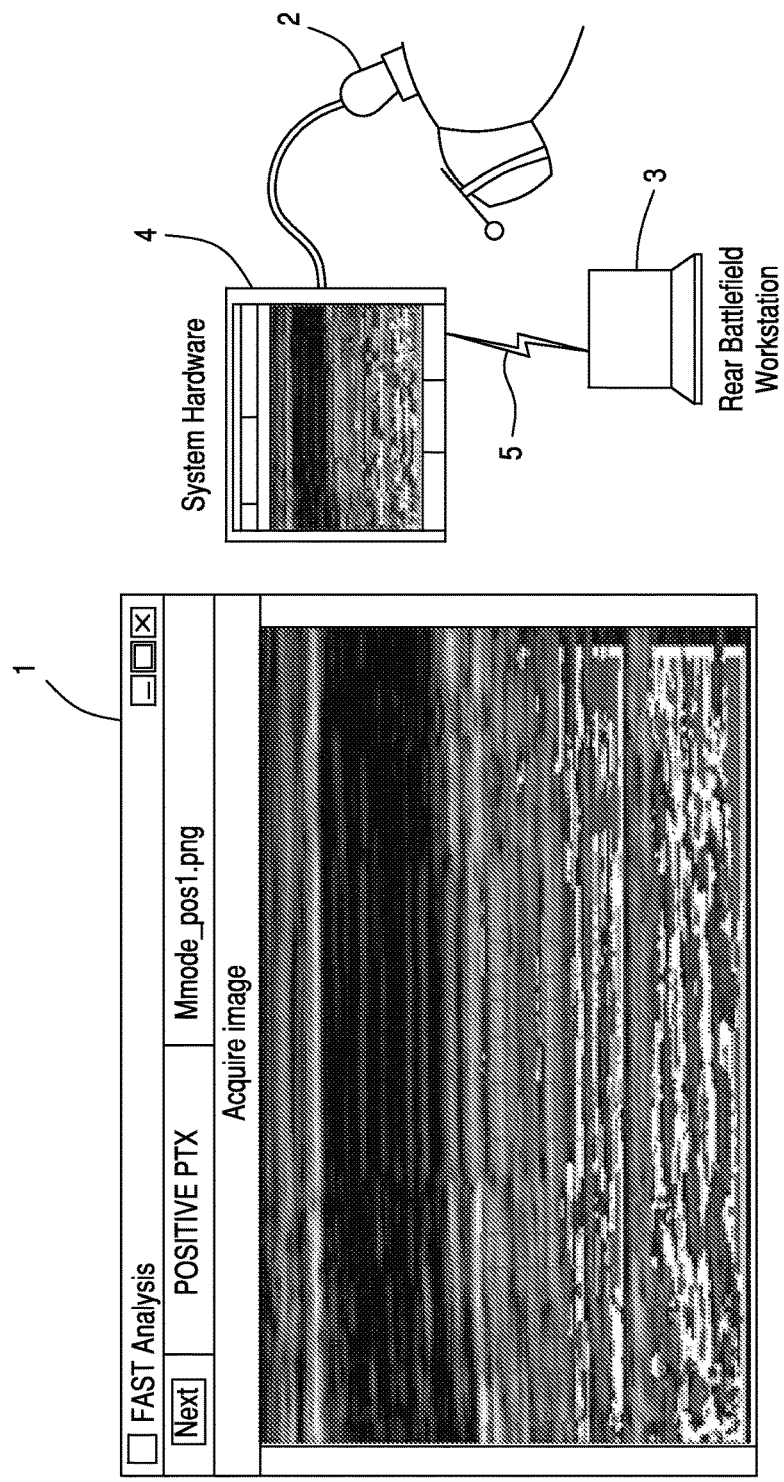
FIG. 14 is a system diagram according to an embodiment of the invention.
Figure 15:
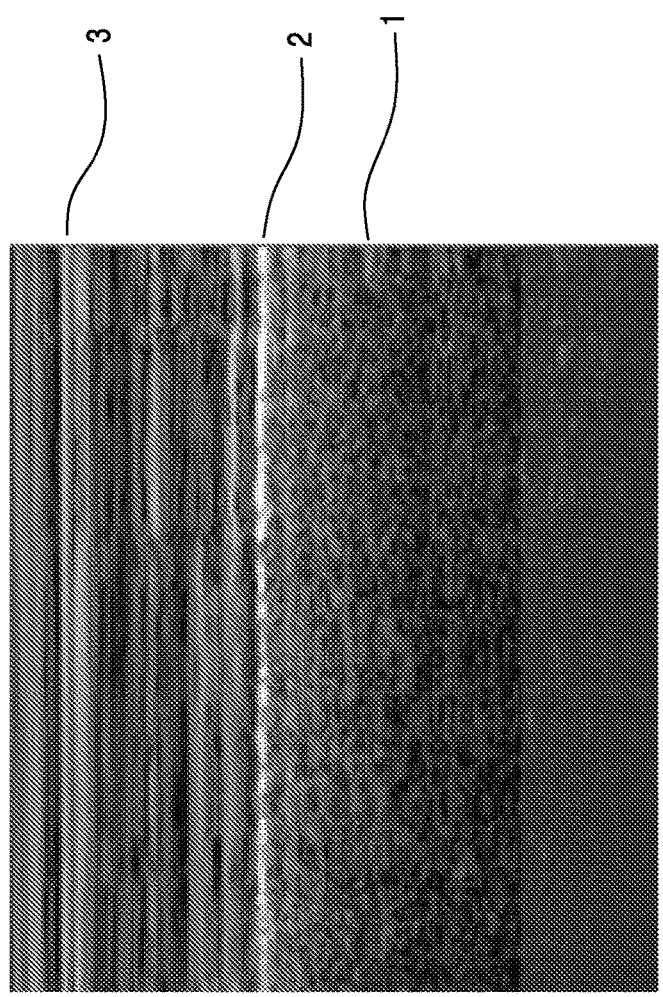
FIG. 15 illustrates a filtered image according to another embodiment of the invention.

In at least one embodiment, the seashore pattern is a chain of thin horizontally elongated blobs of maximum intensity, roughly horizontal (e.g., horizontal lines in both parts of FIG. 5). The sand pattern can be a small, elongated, rounded, and bright blob below the seashore pattern, that are up to several wavelengths in diameter (e.g., white blob in FIG. 14). The sky pattern can be a relatively light horizontal line, in the upper portion of an image (e.g., marked by a red box to the upper left of FIG. 5 and indicated by (3) in FIG. 15).

A surf pattern can be a roughly horizontal bright line that sometimes appears above the seashore pattern and below the sky pattern. The surf pattern may be a tissue interface outwards from a pleural interface, such as between muscle and fat. A pebble pattern can be a rounded, elongated, and bright blob below the pleural line, that is about twice the size of a sand pattern (e.g., blob in FIG. 14). A region of an image can be "grainy" when sand and pebble patterns are the dominant features of the region. This is usually the case in a beach pattern (e.g., (1) in FIG. 15).

Figure 3:
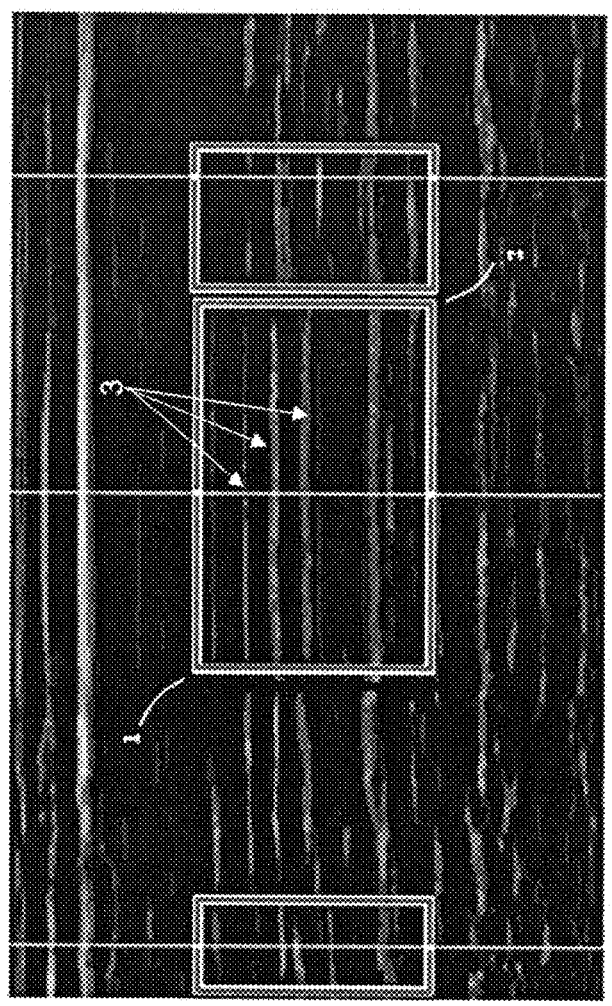
FIG. 3 illustrates ultrasonic imagery showing barcodes in M mode with positive pneumothorax according to an embodiment of the invention.
Figure 4:
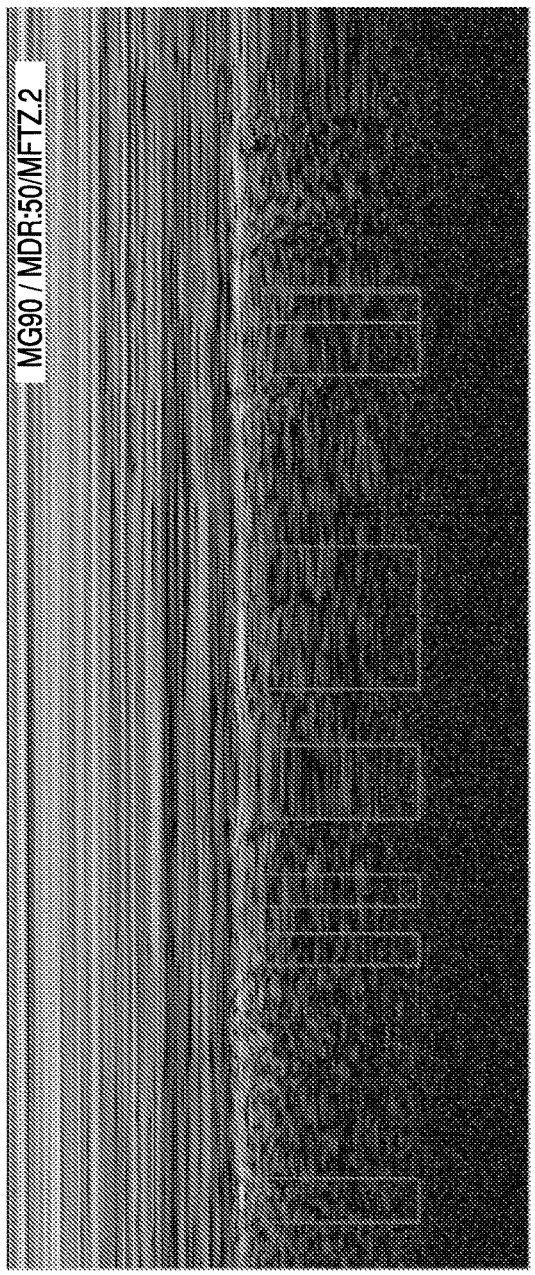
FIG. 4 illustrates ultrasonic imagery showing barcodes in with negative pneumothorax according to an embodiment of the invention.
Figure 5:
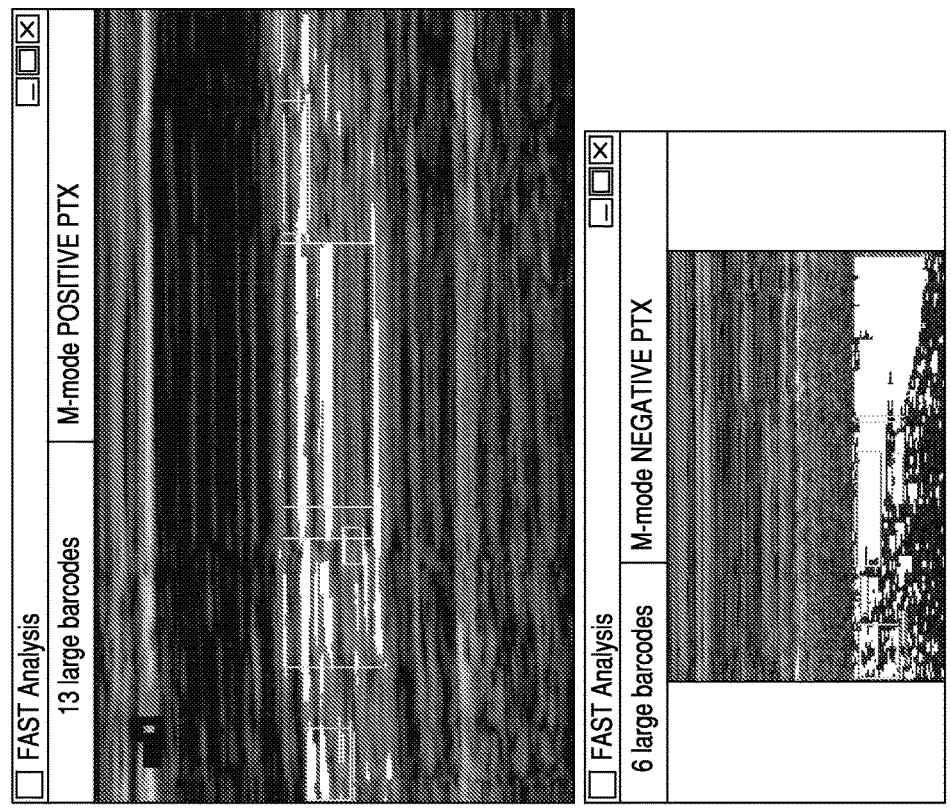
FIG. 5 illustrates ultrasonic imagery showing M mode predictions according to an embodiment of the invention.

A barcode pattern can be a rectangle of adjacent widges patterns, bounded to the left and right by relatively abrupt changes of intensity (e.g., FIGS. 3 and 4). A widge pattern can be a horizontal ridge of peak intensity only a few pixels wide. Barcode patterns generally contain a number of widges (e.g., (3) in FIG. 3). A beach pattern can be a region below a seashore pattern which is mostly grainy, wherein barcodes, if any, tend to be shorter and more numerous in a beach pattern than in an ocean pattern. An ocean pattern can be a region between a sky pattern and a seashore pattern (e.g., (1) in FIG. 15). A stratosphere pattern can include alternating light and dark horizontal bands covering most of an image. The stratosphere pattern is not grainy, and can include few barcodes if any (e.g., FIG. 3). A washed-out pattern can include a beach pattern primarily covered by sand or pebble patterns, and few short barcodes if any.

A barcode pattern can be extracted by detecting horizontal valleys or ridges (i.e., widge patterns) and extending the bounding rectangle of the barcode vertically by finding adjacent widge patterns that end at approximately the same place. A barcode pattern can also be extracted by detecting columns in an image that have many abrupt changes in intensity, wherein the area between the columns is filled with widge patterns. Several vertical image lines may be found with many abrupt changes along them extending vertically through a beach pattern, and often into an ocean pattern above it. These abrupt changes may be caused by the brief pause in motion between breaths either in or out. During the breath itself, the lungs (e.g., beach pattern) and usually the tissue above them (e.g., ocean pattern) are moving fairly rapidly and synchronously across the plane of the M-scan beam, thus appearing to be horizontal ridges and valleys of approximately uniform intensities.

In some M-scan images, one sees both beach and ocean "sliding" due to possible adhesions of the inner and outer membranes of the pleural interface or line. Normally there is a lubricating fluid in this interface which allows the lungs to slide inside the chest, while the chest tissue remains relatively stationary. In this case, one often observes barcodes below the seashore pattern (i.e., the pleural interface) but not above it, indicating healthy tissues in the field of view of the ultrasonic probe.

The analysis engine 1130 applies rules (also referred to herein as "business logic") to the identified patterns to identify the internal trauma 1230. As used herein, the term "analysis engine" includes a hardware device in a computer connected to the processor 1120 and/or filtering device 1110. The internal trauma can include pneumothorax, hemothorax, and/or abdominal hemorrhaging.

In at least one embodiment, the rules are applied by an expert system known as a decision tree, which follows the known BLUE Protocol developed by Lichtenstein et al. In each branch of the decision tree, a rule decides which branch to take based on an extracted feature (also referred to herein as an "identified pattern") by a preceding image processing stage. For example, if the feature "B Profile" as termed in the BLUE Protocol has been extracted, and a top-level decision about presence or absence of the feature known as lung sliding has already been decided for absence, then the extraction of the B Profile feature causes the rule at this absence node to predict or identify pneumonia. Similarly, a "sister" branch at the same level as the B-mode branch below the absence node will predict "A lines" if an A-lines feature has been extracted. Otherwise if A-lines are extracted and the corresponding branch is taken for A-lines, then if a "Lung Point" feature is detected, indicating partly normal lung surface and partly collapsing, then pneumothorax is predicted by the system.

Except at the top-level node of the tree, simple logic rules can be implemented at the lower nodes based on dynamically adapted thresholds, while the top-level decision tree node can require a more intricate decision mechanism than simple logic to make decisions (e.g., presence versus absence of lung sliding). Thus, for this purpose, two statistical classifiers can be used of the type which employ linear or flat hypersurfaces in a hyperspace to "separate" combinations of extracted features represented as coordinates in the hyperspace by their respective feature strengths.

Specifically, two such classifiers can be trained or tuned based on the statistics of many trial runs with known outcomes, the first to identify tissue-like feature combinations, and a second classifier to identify shifting movements of tissue-like features above versus below the extracted pleural line. The tissue-like identification can make static measurements of a number of commonly identified features (by humans) such as small blobs below the pleural line often called "sand" as on a "seashore" versus relative lack of sand above the pleural line. The ultrasound may not typically reflect as much as below to create the small blobs as interference patterns.

Other tissue-like features can include various entropies and autocorrelations as commonly computed as a ratio of feature measurements or "strengths" above and below the approximated pleural line in the given imagery. The second statistical classifier can be similarly trained to separate points in a second hyperspace whose coordinates include a number of "ants" along the pleural line (peaks in intensity), ring-downs, and average shearing movement distance of sand below the pleural line relative to the ant peak locations. Thus, the presence of lung sliding can be based on a linear combination of two "distances" in the respective hyperspaces of the classifiers. The "first distance" can be the Cartesian distance of a point representing as coordinates in a hyperspace a combination of tissue-like features for a patient's chest to an optimally positioned hyperplane to best separate tissue-like versus non-tissue-like combinations. The second distance can similarly be a distance from a point representing shearing motions and ant movements of the patient's chest to an optimally positioned hyperplane in the second hyperspace (used by the second classifier). Each of the classifiers can produce an ordinal "score" distance with three values (e.g., "0", "1", or "2"). The greater the distance, the greater the score, so that these scores can be represented as an ordered pair, the first being the tissue-like score, and the second being the movement score. Using these scores, the top level decision is made by choosing the lung sliding presence branch if either a pair (1, 1), or a pair (2, 1), or a pair (1, 2) is obtained. Otherwise, if (0, 0), (1, 0), (0, 1) are obtained, then the absence of lung sliding branch can be chosen at the top node of the tree.

In at least one embodiment, an additional rule can be added that provides that the identifying of the internal trauma includes identifying pneumothorax when the identifying of the patterns includes identifying A lines and a pulsating feature known as a lung pulse, and the identifying of the patterns does not include identifying a lung point feature.

The classifier distances can be reduced to two scores, such as "0" or "1", by respectively exceeding or falling below a given threshold for the tissue-like features or a similar distance and threshold for features shifting relative to each other above and below the approximate pleural line. At the top level of the decision tree, the presence lung sliding branch can be chosen when (1, 1), or (1,0), or (0,1) is obtained; otherwise, the absence or abolished branch can be chosen if (0, 0) is obtained and there is no intermediate branch.

In at least one embodiment, classifier distances are reduced to two scores such as "0" or "1" via exceeding or falling below of a given threshold for the tissue-like features or a threshold for the features shifting relative to each other above and below the approximate pleural line, respectively. At the top level of the decision tree, the presence lung sliding branch can be chosen when (1, 1) is obtained; otherwise, the absence branch can be chosen when (1, 0) or (0, 1) or (0, 0) is obtained and there is no intermediate branch.

Distance scores can also be combined by choosing the presence lung sliding branch at the top level of the decision tree when scores are determined specifically by two thresholds for each distance. If the distance of tissue like features falls below the lower of the two thresholds, then a score of 0 can be obtained, while if the distance lies between the first and second threshold, then 1 can be obtained. When the distance exceeds the higher threshold, then 2 can be obtained as the score for that given classifier, similarly for the features shifting relative to each other above and below the approximate pleural line.

In another embodiment, distance is calculated where the maximum absolute difference in coordinate and its projection on the given separating hyperplane for the given classifier, one of the two, are taken as the distance. This may be referred to as the taxicab distance. In yet another embodiment, distance is calculated where the covariances are taken into account by a classifier, in computing the distance of the point representing a combination of features to the separating hyperplane for the classifier. This may be referred to as the Mahalanobis distance. One or both separating hypersurfaces can be flat hyperplanes. In another embodiment, one or both separating hypersurfaces are non-flat hypersurfaces, in particular as can be determined by means of quadratic nonlinear kernels. Moreover, the hypersurface can be a hyperplane, that is, a flat surface of dimension one less than the hyperspace in which it is imbedded.

A single statistical classifier can be used to make the decision at the top node or level of a decision tree, which can implement rules to take one of two branches. The branches can include a branch for lung sliding present, and a branch for lung sliding abolished or absent, as are terms of the BLUE Protocol.

In at least one embodiment of the invention, the rules include a plurality of statistical classifiers, each for multiple features, together with logic rules for single features which include rules based on three-way decisions. Specifically, two thresholds can be set by training, such that one of three decisions are made when the feature's value falls below one of the thresholds. A second decision can be made if the value falls between the two thresholds; and, the third decision can be made if the value exceeds the second threshold. The classifiers can employ distance metrics and kernel transforms used in the implementation of such classifiers. The rules can implement another diagnostic protocol for ultrasonic examinations which is used in the medical practice.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
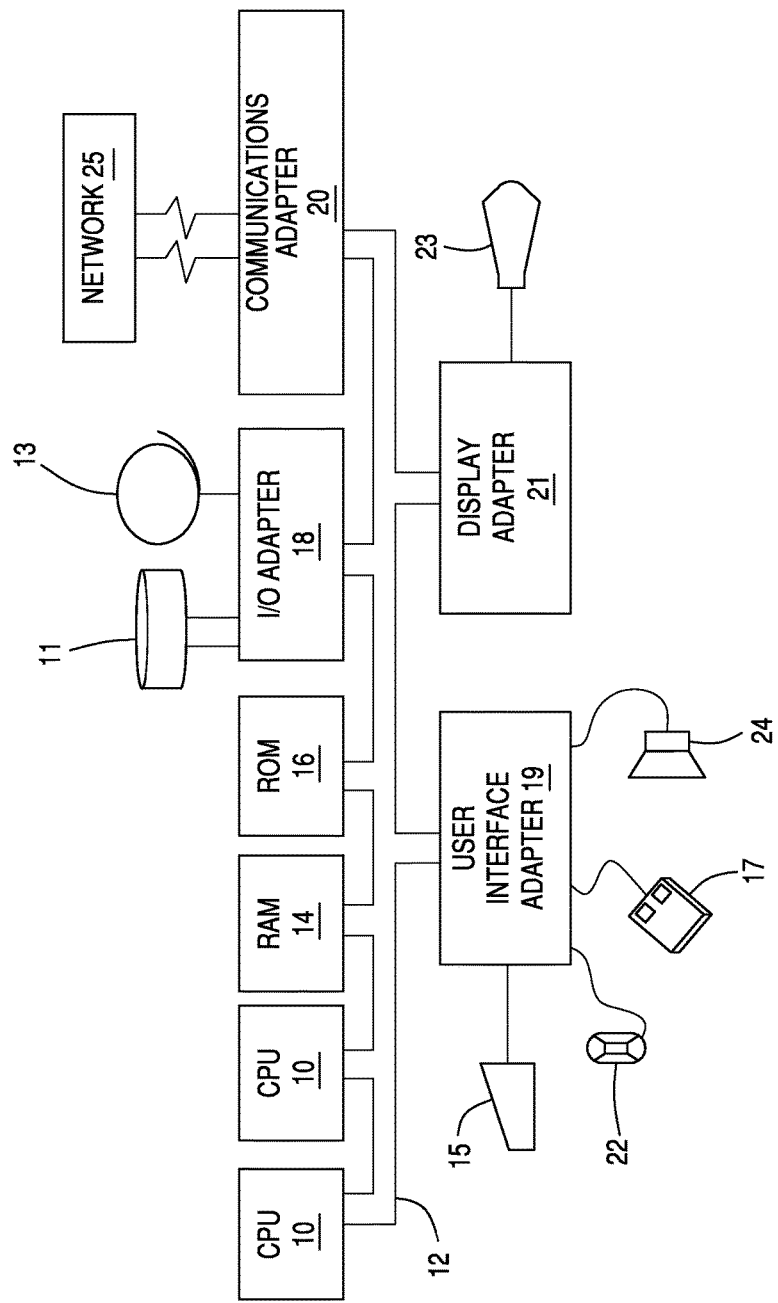
FIG. 16 illustrates a computer program product according to an embodiment of the invention.

Referring now to FIG. 16, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

INDUSTRIAL APPLICABILITY

A method for identifying internal trauma in a patient is provided. The provided methods and systems are particularly suited for filtering acquired images to remove artifacts and identifying patterns in the filtered images, wherein the patterns can include an irregular blob fitted to a blood pool, an A-line pattern, a B-line pattern, a lung sliding pattern, a barcode pattern, a sky pattern, a seashore pattern, or a beach pattern. Rules are applied to the identified patterns to identify the internal trauma, wherein the internal trauma can include pneumothorax, hemothorax, or abdominal hemorrhaging.

What is claimed is:

1. A method for identifying internal trauma in a patient, said method comprising:
   filtering images by a filtering device to remove artifacts;
   identifying patterns in the filtered images by a processor, the patterns including a plurality of barcode patterns and at least one of an irregular blob fitted to a blood pool, an A-line pattern, a B-line pattern, a lung sliding pattern, a sky pattern, a seashore pattern, and a beach pattern; and
   applying rules to the identified patterns by an analysis engine to identify the internal trauma, the internal trauma including at least one of pneumothorax, hemothorax, and abdominal hemorrhaging,
   wherein the identification of the internal trauma is based on a location of the barcode patterns with respect to a pleural line.

2. The method according to claim 1, wherein the A-line pattern includes substantially horizontal and substantially straight narrow bands of apparent reflection parallel to and below a pleural line.

3. The method according to claim 2, wherein the pleural line includes a bright, substantially horizontal or radial narrow band indicating probable reflection from fluid between a chest wall membrane and a membrane surrounding lungs, wherein the fluid is a lubricant to aid the lungs in sliding within the chest as a person breathes.

4. The method according to claim 1, wherein the A-line pattern includes at least one line between skin and a muscle layer between ribs.

5. The method according to claim 1, wherein the A-line pattern includes at least one line between outer muscles and lungs.

6. The method according to claim 1, wherein the B-line pattern includes a band of varied bright intensities radiating downwards from a pleural line to a bottom of an image.

7. The method according to claim 1, wherein the lung sliding pattern includes rapidly moving peaks of intensity along a pleural line.

8. The method according to claim 1, wherein the lung sliding pattern includes rapid movement of ring-downs, wherein the ring-downs include short, substantially triangular interference patterns just below the pleural line.

9. The method according to claim 8, wherein the ring-downs are present due to at least one of:
   adhesions between inner and outer membranes of a pleural interface, and
   a small air bubble in lungs.

10. The method according to claim 1, wherein each barcode pattern includes a rectangle of adjacent widge patterns that are bounded to the left and right by abrupt changes of intensity, wherein a widge pattern is a horizontal ridge of peak intensity that is only a few pixels wide.

11. The method according to claim 1, wherein the sky pattern includes a light horizontal line in an upper portion of an image.

12. The method according to claim 1, wherein the seashore pattern includes a chain of thin horizontally elongated blobs of maximum intensity on an image.

13. The method according to claim 12, wherein the beach pattern includes a region below the seashore pattern that is mostly grainy.

14. The method according to claim 1, wherein the image further includes an ocean pattern between the sky pattern and the seashore pattern, and
   wherein the beach pattern further includes barcode patterns that are shorter and more numerous with respect to barcode patterns in the ocean pattern.

15. The method according to claim 1, wherein each barcode pattern only includes widge patterns that extend horizontally and end at the same location.

16. A method for identifying internal trauma in a patient, said method comprising:
   filtering acquired images by a filtering device to remove artifacts;
   identifying patterns in the filtered images by a processor, the patterns including a plurality of barcode patterns and at least one of an irregular blob fitted to a blood pool, an A-line pattern, a B-line pattern, a lung sliding pattern, a sky pattern, a seashore pattern, and a beach pattern, wherein the A-line pattern includes substantially horizontal and substantially straight narrow bands of apparent reflection parallel to and below a pleural line; and
   applying rules to the identified patterns by an analysis engine to identify the presence of any internal trauma, the internal trauma including pneumothorax, hemothorax, and abdominal hemorrhaging,
   wherein the identification of the presence of any internal trauma is based on a location of the barcode patterns with respect to a pleural line.

17. The method according to claim 16, wherein the pleural line includes a bright, substantially horizontal or radial narrow band indicating probable reflection from fluid between a chest wall membrane and a membrane surrounding lungs, wherein the fluid is a lubricant to aid the lungs in sliding within the chest as a person breathes.

* * * * *